United States Patent
Hubbard et al.

(10) Patent No.: US 11,930,861 B2
(45) Date of Patent: Mar. 19, 2024

(54) AEROSOL PROVISION SYSTEM WITH INTEGRATED CHARGER

(71) Applicant: RAI Strategic Holdings, Inc., Winston-Salem, NC (US)

(72) Inventors: Sawyer Hubbard, Winston-Salem, NC (US); Jason Short, Winston-Salem, NC (US); Cassidy McMahan, Pfafftown, NC (US); Vahid Hejazi, Concord, NC (US); Jason L. Wood, Lexington, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 463 days.

(21) Appl. No.: 17/113,679

(22) Filed: Dec. 7, 2020

(65) Prior Publication Data

US 2022/0175048 A1    Jun. 9, 2022

(51) Int. Cl.

| | |
|---|---|
| *A24F 40/90* | (2020.01) |
| *A24F 7/00* | (2006.01) |
| *A24F 40/10* | (2020.01) |
| *A24F 40/42* | (2020.01) |
| *A24F 40/46* | (2020.01) |
| *A24F 40/57* | (2020.01) |
| *A24F 40/60* | (2020.01) |

(Continued)

(52) U.S. Cl.
CPC ............... *A24F 40/90* (2020.01); *A24F 7/00* (2013.01); *A24F 40/10* (2020.01); *A24F 40/42* (2020.01); *A24F 40/46* (2020.01); *A24F 40/57* (2020.01); *A24F 40/60* (2020.01); *H01R 13/501* (2013.01); *H02J 7/0045* (2013.01); *H05B 3/0019* (2013.01); *H05B 3/141* (2013.01); *H05B 3/145* (2013.01)

(58) Field of Classification Search
CPC .......... A24F 40/40; A24F 40/20; A24F 40/90; A24F 7/00; A24F 40/10; A24F 40/42; A24F 40/46; A24F 40/57; A24F 40/60
See application file for complete search history.

(56) References Cited

U.S. PATENT DOCUMENTS

2014/0007891 A1 * 1/2014 Liu ..................... A24F 40/40
131/329

FOREIGN PATENT DOCUMENTS

| CA | 3115794 A1 * | 4/2020 | ............ A24F 40/10 |
|---|---|---|---|
| CN | 202112305 U | 1/2012 | |

(Continued)

OTHER PUBLICATIONS

World Intellectual Property Organization, International Search Report for PCT/IB2021/061378, dated Feb. 8, 2022.

*Primary Examiner* — Jean F Duverne
(74) *Attorney, Agent, or Firm* — Womble Bond Dickinson (US) LLP; Chris Humphrey; John V. Forcier

(57) ABSTRACT

The present disclosure is directed to the concept of integrating a charger with an electronic aerosol provision device into a single unit, so as to eliminate the need for a user to carry or stow charging cables, adaptors, and/or docks. In various implementations, the device utilizes a standard USB plug that is permanently attached to the device body and fully integrated with the charging circuitry. In some implementations, the plug may extend from an end of the device or be deployed from a side wall of the device and/or from the mouthpiece end of the device. The charger may be covered or otherwise hidden when the device is not charging.

34 Claims, 13 Drawing Sheets

(51) Int. Cl.
  *H01R 13/50*     (2006.01)
  *H02J 7/00*      (2006.01)
  *H05B 3/00*      (2006.01)
  *H05B 3/14*      (2006.01)

(56)           References Cited

FOREIGN PATENT DOCUMENTS

CN        203482904 U    *  3/2014
EP          3632239 A1   *  4/2020  ............. A24B 15/16
WO       WO-9200770 A1   *  1/1992
WO    WO-2016026756 A1   *  2/2016  ........... A24B 15/167
WO    WO-2020/016184 A1     1/2020

* cited by examiner

100

| AEROSOL PROVISION DEVICE 102 | | CONSUMABLE 104 | |
|---|---|---|---|
| HOUSING 108 | | SUBSTRATE 134 | |
| POWER SOURCE 110 | | AEROSOL-GENERATING MATERIAL 124 | |
| CIRCUITRY 112 | AEROSOL GENERATOR 106 | SUBSTANCE 126 | |
| SWITCH 114 | | FLAVORANT 128 | |
| UI 116 | | AEROSOL-FORMER MATERIAL 130 | |
| PROCESSING CIRCUITRY 118 | | FUNCTIONAL MATERIAL 132 | |
| COUPLER 120 | | | |
| RECEPTACLE 122 | | | |

FIG. 1

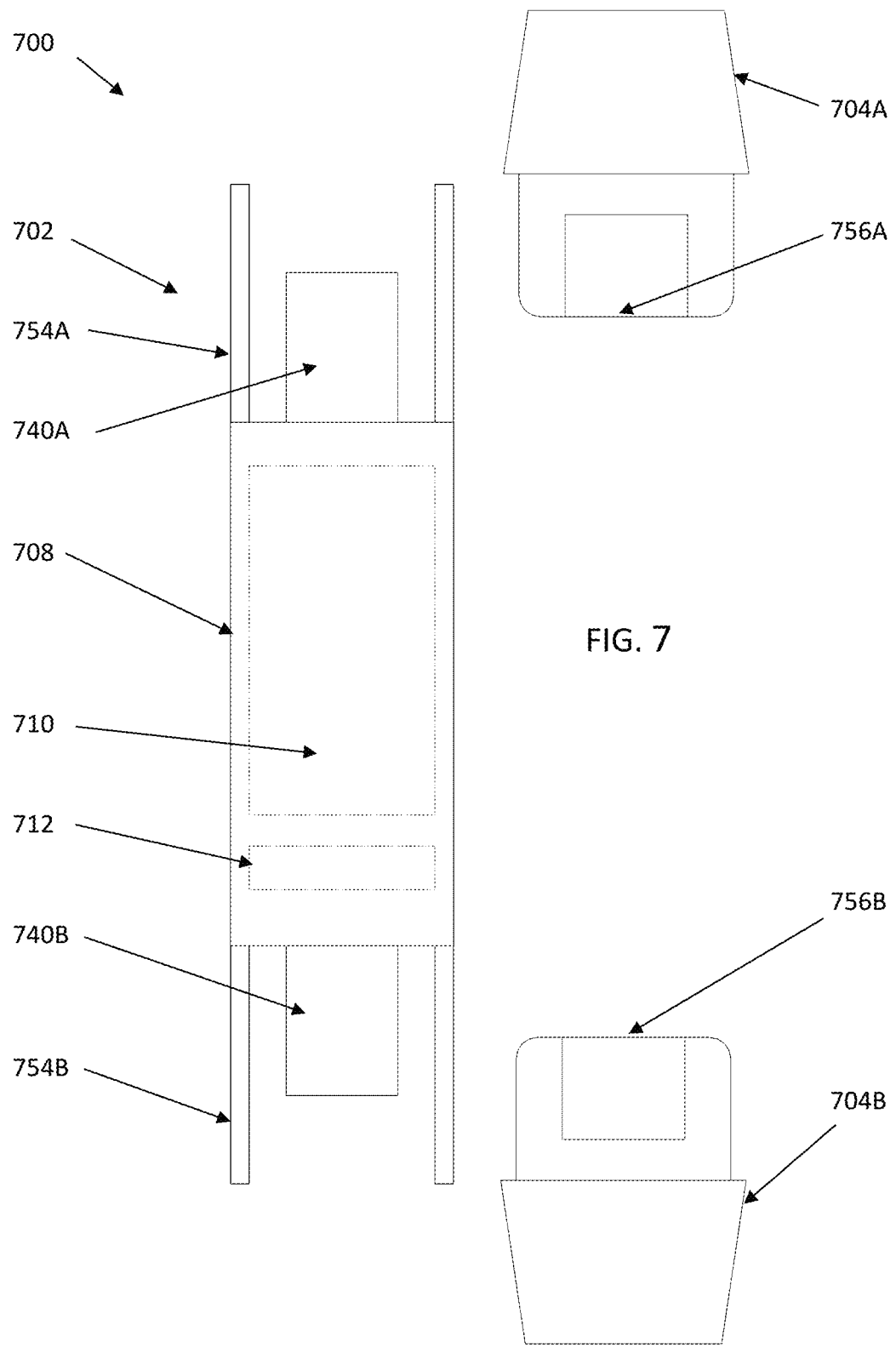

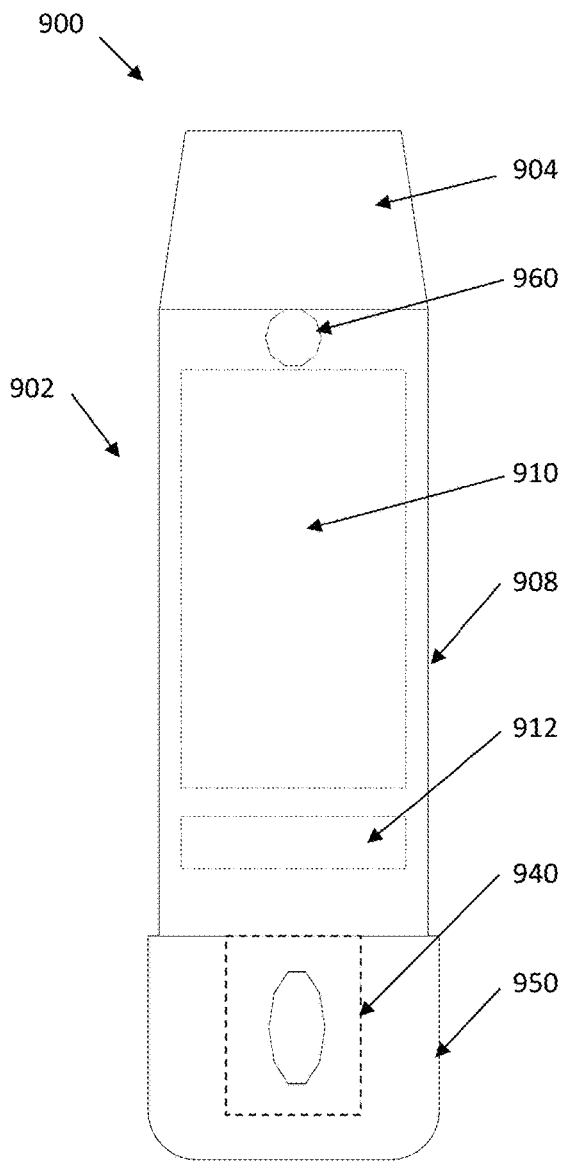
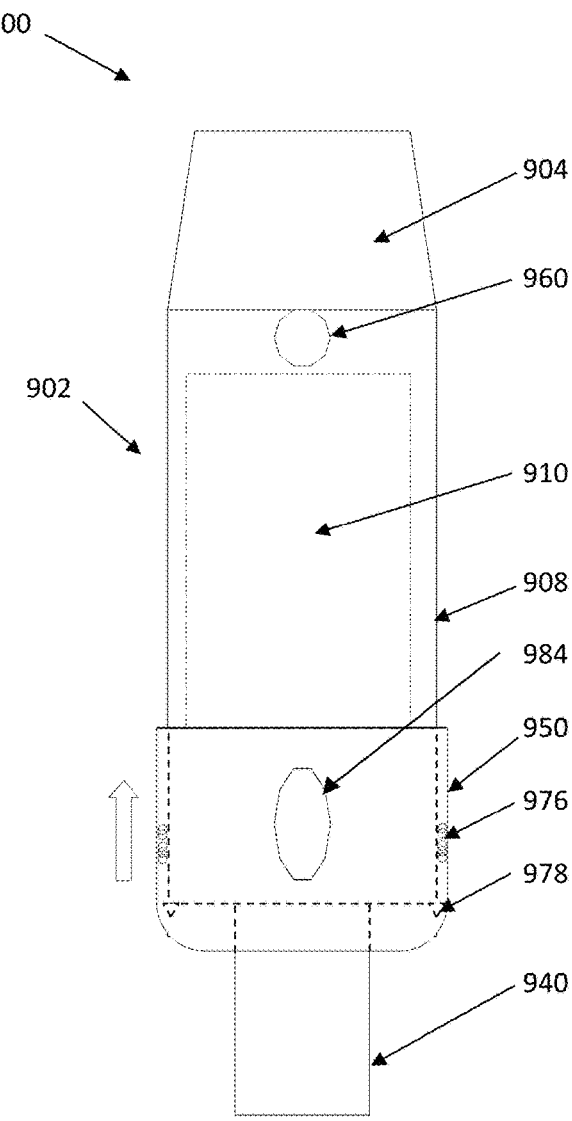
FIG. 9A                               FIG. 9B

AEROSOL PROVISION SYSTEM WITH INTEGRATED CHARGER

TECHNOLOGICAL FIELD

The present disclosure relates to aerosol provision systems such as smoking articles designed to deliver at least one substance to a user.

BACKGROUND

Many aerosol provision systems and in particular non-combustible aerosol provision systems have been proposed through the years as improvements upon, or alternatives to, smoking products that require combusting tobacco for use. These systems are generally designed to deliver at least one substance to a user, such as to satisfy a particular "consumer moment." To this end, the substance may include constituents that impart a physiological effect on the user, a sensorial effect on the user, or both. The substance may be generally present in an aerosol-generating material that may contain one or more constituents of a range of constituents, such as active substances, flavors, aerosol-former materials and other functional materials like fillers.

Aerosol provision systems include, for example, vapor products commonly known as "electronic cigarettes," "e-cigarettes" or electronic nicotine delivery systems (ENDS), as well as heat-not-burn products including tobacco heating products (THPs) and carbon-tipped tobacco heating products (CTHPs). Many of these products take the form of a system including a device and a consumable, and it is the consumable that includes the material from which the substance to be delivered originates. Typically, the device is reusable, and the consumable is single-use (although some consumables are refillable). Therefore, in many cases, the consumable is sold separately from the device, and often in a multipack. Moreover, subsystems and some individual components of devices or consumables may be sourced from specialist manufacturers.

BRIEF SUMMARY

Example implementations of the present disclosure are directed to the concept of integrating a charger with an electronic aerosol provision device into a single unit, so as to eliminate the need for a user to carry or stow charging cables, adaptors, and/or docks. In various implementations, the device utilizes a standard USB plug that is permanently attached to the device body and fully integrated with the charging circuitry. The plug may extend from the end of the device opposing the mouthpiece and covered or hidden while the device is not charging. In some implementations, the plug may be deployed from a side wall of the device and/or from the mouthpiece end of the device, for example, by incorporating the plug into the mouthpiece assembly.

Some of the advantages of integrating the charger into the device include eliminating the interface between the charging cable and the device, which can become corroded, eroded, or prevent connection by some other means, and eliminating various parts, which reduces the cost of manufacture, environmental impact, and amount of packaging required to contain all the parts and pieces. Additionally, the user benefits as the integrated charging port provides peace of mind that the charger is always available and a moving piece that the user can occupy themselves with while holding the electronic aerosol delivery device.

The present disclosure includes, without limitation, the following example implementations.

Some example implementations provide an aerosol provision device that includes a housing configured to interface with a consumable (e.g., a cartridge or tobacco stick), a power source disposed within the housing and configured to provide power to an aerosol generator (e.g., a heater disposed within a cartridge), and a charging component coupled to the housing and in electrical communication with the power source, the charging component configured to interface directly with an external power source. The charging component may be coupled to the housing either directly or indirectly, removably or fixedly, and/or electrically or mechanically.

In some example implementations of the aerosol provision device of any preceding example implementation, or any combination of any preceding example implementations, the charging component is a male-end port selected from the group consisting of Universal Serial Bus (USB) type A, USB type B, USB type C, mini USB type A, micro USB type A, mini USB type B, micro USB type B, an AC plug, or other type of 5V connector currently known or later developed. The charging connection may be at least partially disposed within the housing in a first position and extend from at least one of a distal end or a side wall of the housing in a second position. Generally, the first position relates to the charging connection being retracted or otherwise in a stored orientation, while the second position relates to the charging connection being fully deployed or otherwise in a charging orientation. In the second position, a longitudinal axis of the charging connection may intersect with a longitudinal axis of the aerosol provision device at an angle of about 30 degrees to about 90 degrees. The charging connection may be capable of movement of up to 360 degrees relative to the device, but its orientation in the second position relative to the longitudinal axis of the device may be perpendicular (i.e., 90 degrees) and any acute or obtuse angle between perpendicular and parallel. Depending on the specific manner in which the charging connection is coupled to the housing, the charging connection may be oriented into any position between the first and second positions and may even be rotatable relative to the housing. In one example, the charging connection may be hingedly coupled to the housing.

In some example implementations of the aerosol provision device of any preceding example implementation, or any combination of any preceding example implementations, the housing of the device further comprises a cap disposed on a distal end of the housing, such that the charging connection is located within the cap when the cap is coupled to a body of the housing. The cap may be removable to expose the charging connection and configured to be secured to another portion of the housing. In some implementations, the cap may be slidably disposed on the housing or fixedly attached to the housing via a hinge mechanism. The cap may include an eyelet for coupling the cap to the device via, for example, a cable, and/or and for attaching to a lanyard so a user may carry the device by wearing it. In additional implementations, the cap is configured as a mouthpiece to be used with the aerosol provision device and may include a flow tube and a flavoring material. In other example implementations, the cap may include at least two portions coupled to the housing via one or more hinge mechanisms and configured so as to rotate relative to the housing to expose the charging connection. The at least two portions may be maintained in a closed configuration by, for example, at least one of a spring mechanism, a snap-fit, a magnetic force, or other mechanical or electro-mechanical device.

In some example implementations of the aerosol provision device of any preceding example implementation, or any combination of any preceding example implementations, the aerosol provision device further comprises a feedback mechanism to indicate to a user that the cap is securely attached to the body of the housing. The feedback mechanism may provide to the user at least one of an audible indication, a tactile indication, a visual indication, or a combination thereof. The housing of the device may further comprise a sleeve engaged with a body of the housing and movable between a retracted position to expose the charging connection and an extended position to at least partially enclose the charging connection. The sleeve may include a door or flap disposed on one end thereof to allow the charging connection to extend therethrough. Additionally, the sleeve, or in some cases the cap, may be slidably coupled to the body of the housing and configured to slide between the retracted and extended positions. The aerosol provision device may further comprise a spring mechanism configured to maintain the sleeve in the extended position.

In some example implementations of the aerosol provision device of any preceding example implementation, or any combination of any preceding example implementations, the aerosol provision device further comprises a rotary mechanism configured to move the sleeve between the retracted and extended positions via a twisting motion. The aerosol provision device may further comprise a feedback mechanism as described herein. In additional implementations, the aerosol provision device further comprises an actuator coupled to the housing and configured to move the charging connection between a first position and a second position relative to the housing, or any orientation therebetween as described herein. The actuator may include at least one of a spring-loaded push button or a sliding mechanism, either of which may include a detent to maintain the charging connection in at least one the first position or the second position. In some example implementations, the charging connection may be coupled to the housing via an electrical cable coupled to the power source, instead of or in addition to any other mechanical or electro-mechanical device described herein. The aerosol provision device may further comprise a spring-loaded spool disposed within a cavity of the housing for securing the charging connection and cable in a retracted position.

In some example implementations of the aerosol provision device of any preceding example implementation, or any combination of any preceding example implementations, the aerosol provision device further comprises the consumable in the form of a cartridge. The cartridge may comprise a mouthpiece having a proximal end and a distal end, the proximal end of the mouthpiece having an exit portal defined therethrough; a tank defining a proximal end and a distal end and being configured to contain an aerosol precursor (e.g., a liquid composition or substrate), wherein the distal end of the mouthpiece is configured to engage the proximal end of the tank; and an aerosol generator configured to generate an aerosol from the aerosol precursor (e.g., the use of a heating assembly configured to heat the liquid composition or substrate). The cartridge may further comprise an integrated circuit having a female-end electrical connection and the power source has a male-end electrical connection configured to removably engage the female-end electrical connection of the cartridge to provide power thereto. The male-end electrical connection is configured to both discharge power from the power source to the aerosol generator and to interface directly with the external power source to charge the power source. In some example, implementations, the male- and female-end connections may be reversed.

Some example implementations provide an aerosol provision device that includes a first cartridge comprising a mouthpiece having a proximal end and a distal end, the proximal end of the mouthpiece having an exit portal defined therethrough; a tank defining a proximal end and a distal end and being configured to contain an aerosol precursor (e.g., a liquid composition or substrate), wherein the distal end of the mouthpiece is configured to engage the proximal end of the tank; an aerosol generator configured to generate an aerosol from the aerosol precursor (e.g., the use of a heating assembly configured to heat the liquid composition or substrate); and an integrated circuit comprising a first half of an electrical connection (e.g., a female end); a housing configured to interface with and at least partially enclose the first cartridge; and a power source disposed within the housing and including a second half of the electrical connection (e.g., a mating male end) configured to removably engage the first half of the electrical connection of the first cartridge to provide power thereto. The second half of the electrical connection is configured to both discharge power from the power source to the aerosol generator and to interface directly with an external power source to charge the power source.

In some example implementations of the aerosol provision device of any preceding example implementation, or any combination of any preceding example implementations, the electrical connections are selected from the group consisting of Universal Serial Bus (USB) type A, USB type B, USB type C, mini USB type A, micro USB type A, mini USB type B, micro USB type B, an AC plug, or other type of 5V connector currently known or later developed. In some example implementations, the aerosol generator (e.g., a heating assembly) and the integrated circuit are integrally formed as a single component, such as a chip with a flat, resistive heater trace printed on one surface and non-resistive leads extending from the same surface to the edge of the chip. The chip is configured to form the first half of the electrical connection and interface with the second half of the electrical connection. The chip comprises at least one of silica, various ceramics such as metals/metalloids oxides like ZnO, $ZrO_2$, NiO, $Fe_2O_3$, $SiO_2$, $GeO_2$, $Cr_2O_3$, $Ce_2O_3$, $TiO_2$, MgO, CaO, BeO, $Al_2O_3$, etc. and/or various nitrides, carbides, borides, silicides, or titanate based ceramics, or their compositions thereof. Other materials can be carbon based substrates or composites including metals, ceramics and/or different types of carbon, in various form factors (fibers, particles, etc.).

In some example implementations of the aerosol provision device of any preceding example implementation, or any combination of any preceding example implementations, the device further comprises a second cartridge. The second cartridge comprises a mouthpiece having a proximal end and a distal end, the proximal end of the mouthpiece having an exit portal defined therethrough; a tank defining a proximal end and a distal end and being configured to contain an aerosol precursor (e.g., a liquid composition or substrate), wherein the distal end of the mouthpiece is configured to engage the proximal end of the tank; an aerosol generator configured to generate an aerosol from the aerosol precursor (e.g., the use of a heating assembly configured to heat the liquid composition or substrate); and an integrated circuit comprising a first half of an electrical connection. The housing is configured to interface with and at least partially enclose the second cartridge at an end of the housing opposite the first cartridge and the power source includes a second half of the electrical connection configured to removably engage the first half of the electrical connection of the second cartridge to provide power thereto. The second half of the electrical connection of the second cartridge is configured to both discharge power from the power source to the aerosol generator of the second cartridge and to interface directly with the external power source to charge the power source. The first cartridge and the second cartridge are interchangeable.

Some example implementations provide a cartridge for an aerosol provision device comprising a mouthpiece having a proximal end and a distal end, the proximal end of the mouthpiece having an exit portal defined therethrough; a tank defining a proximal end and a distal end and being configured to contain an aerosol precursor (e.g., a liquid composition or substrate), wherein the distal end of the mouthpiece is configured to engage the proximal end of the tank; an aerosol generator configured to generate an aerosol from the aerosol precursor (e.g., the use of a heating assembly configured to heat the liquid composition or substrate); and an integrated circuit comprising one half of an electrical connection, wherein the cartridge is configured to interface with the aerosol provision device via a mating half of the electrical connection. The cartridge may be configured to be removably coupled to the aerosol provision device.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURES

Figure 2:
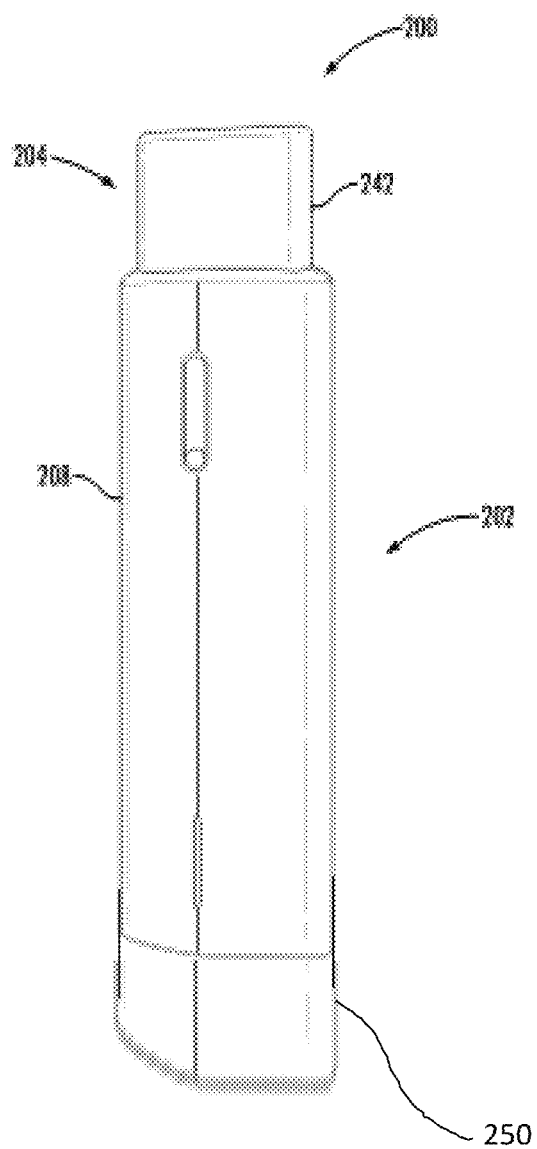
Figure 3:
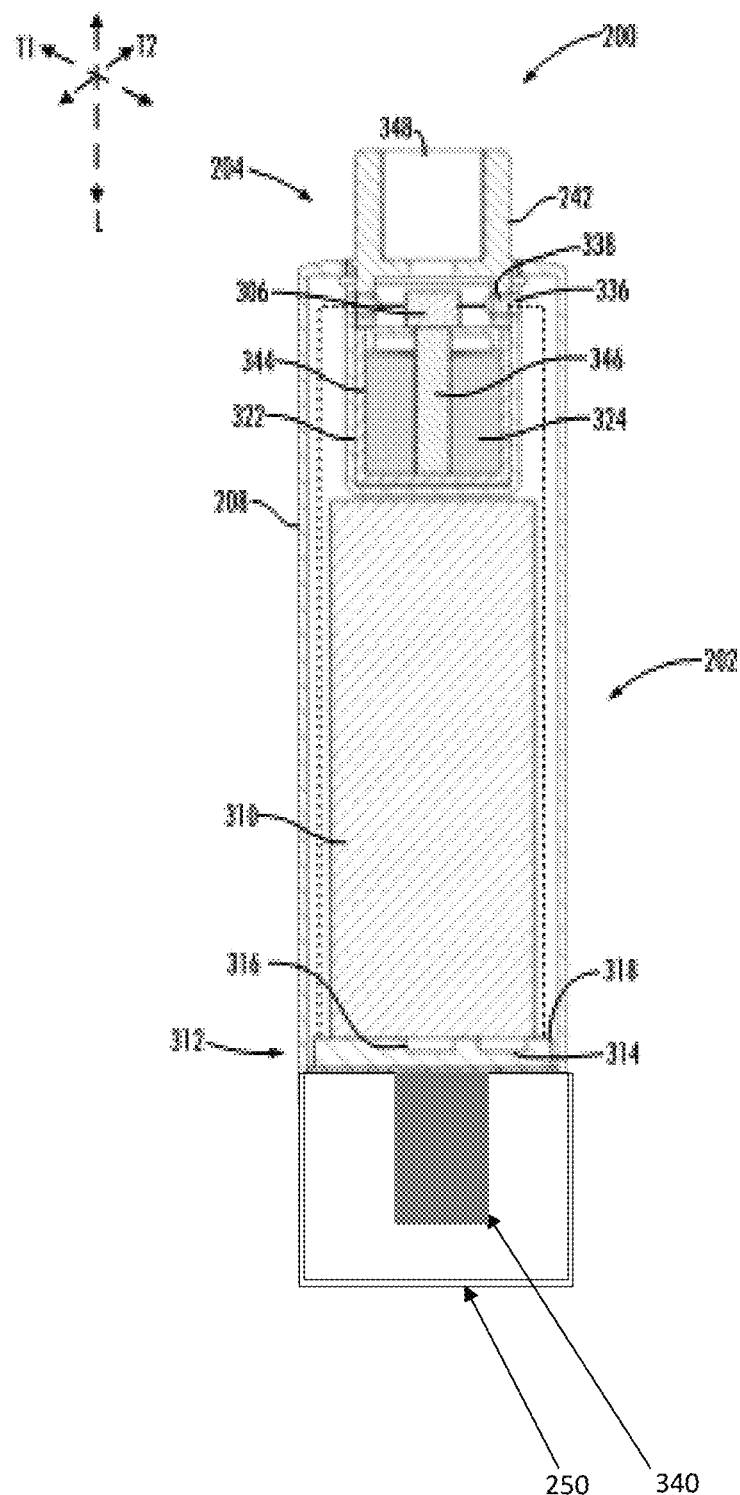
Figures 4A, 4B, 4C:
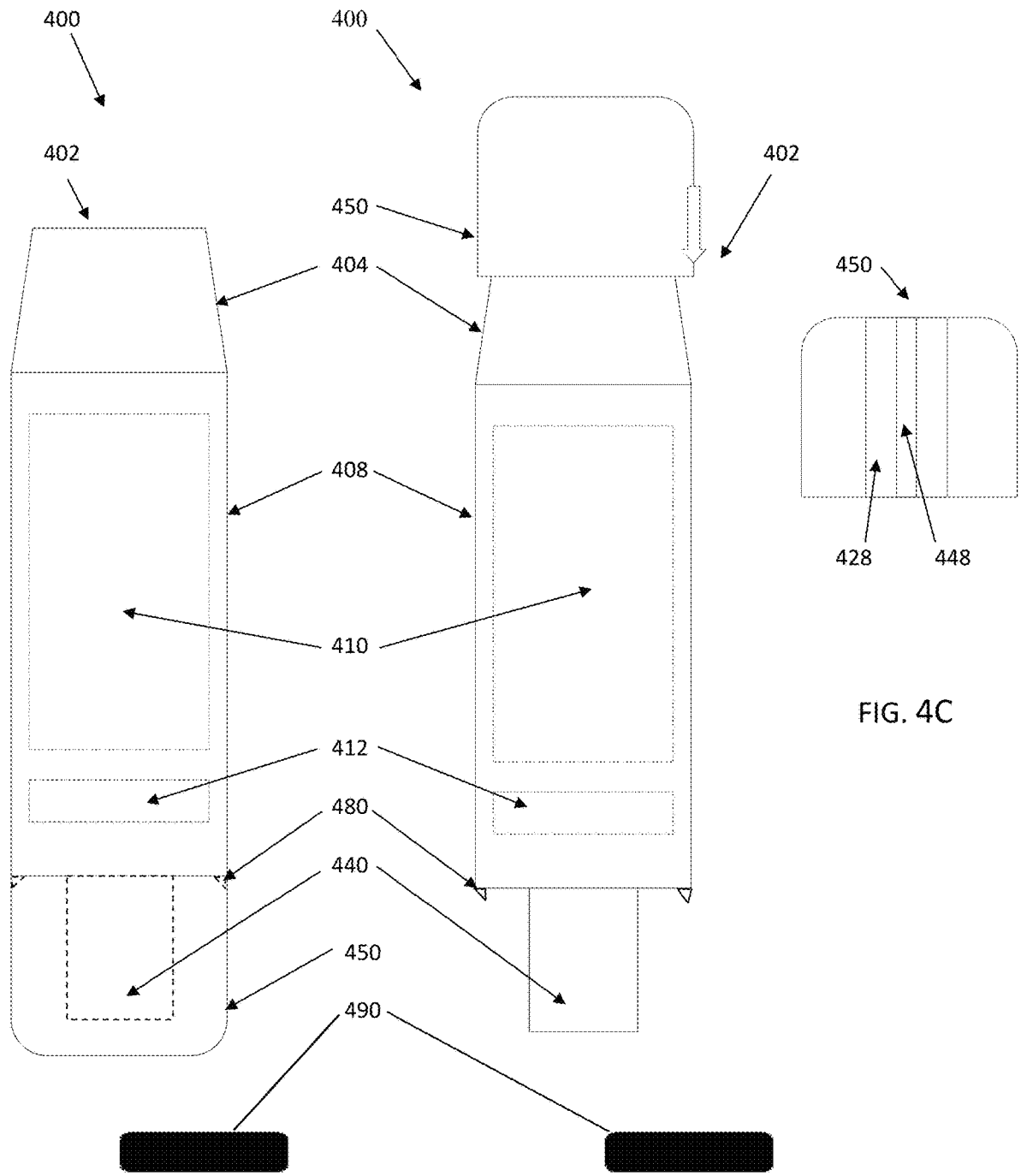
Figure 5:
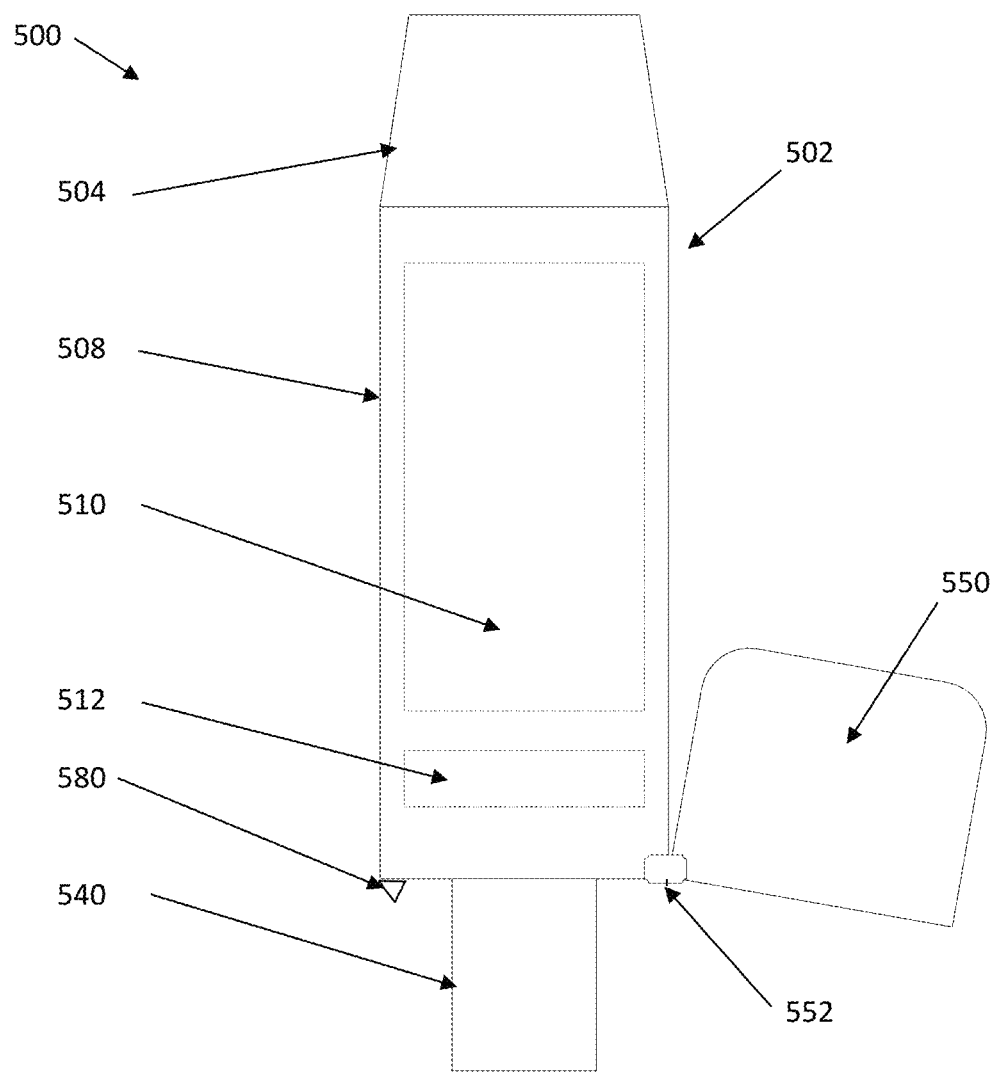
Figures 6A, 6B, 6C:
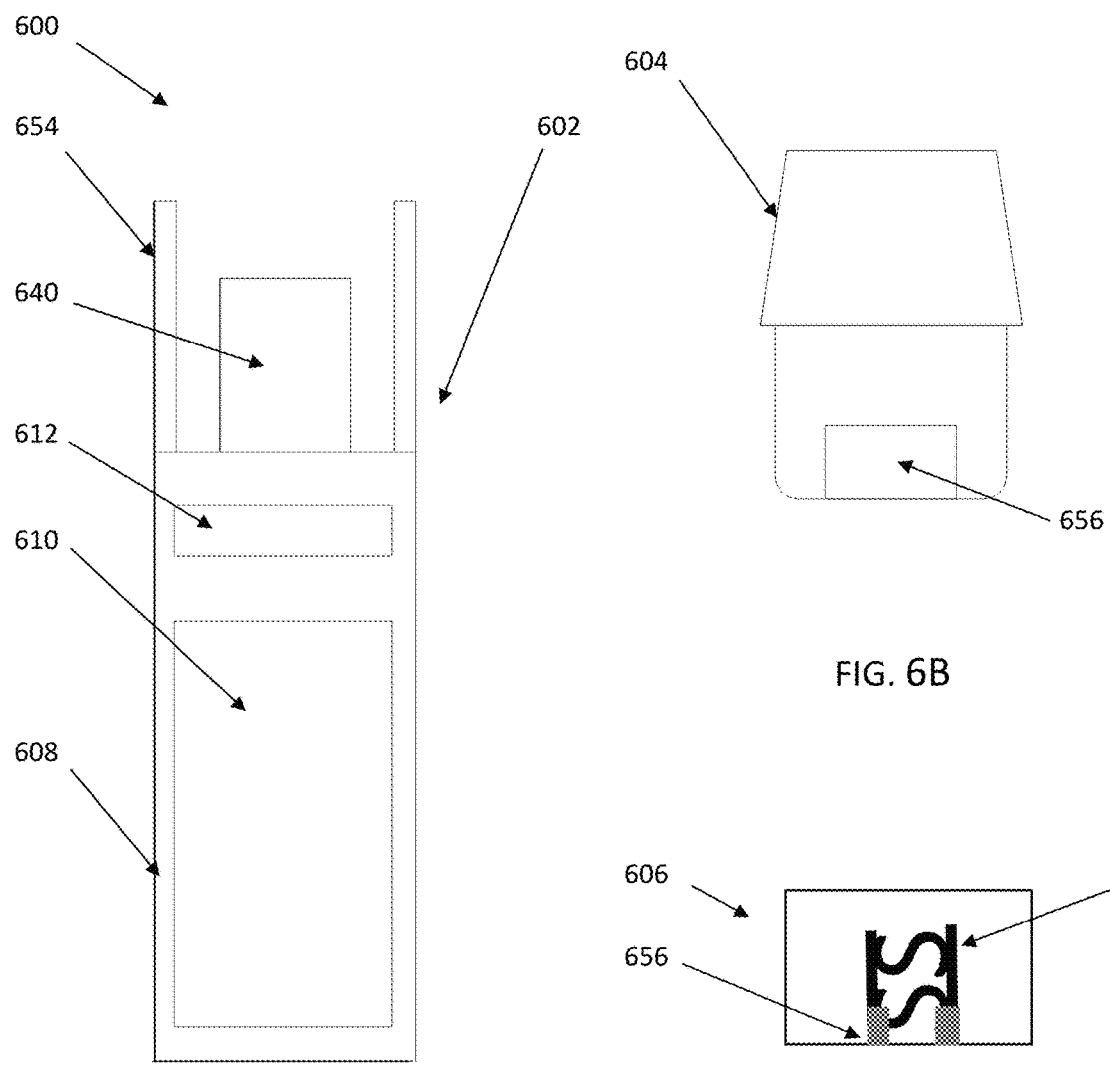
Figure 8A:
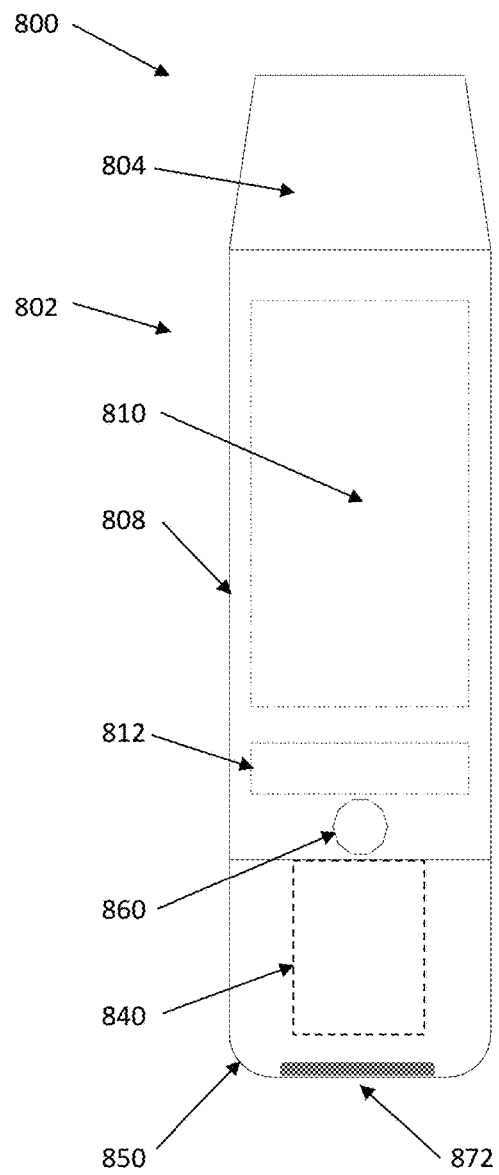
Figure 8B:
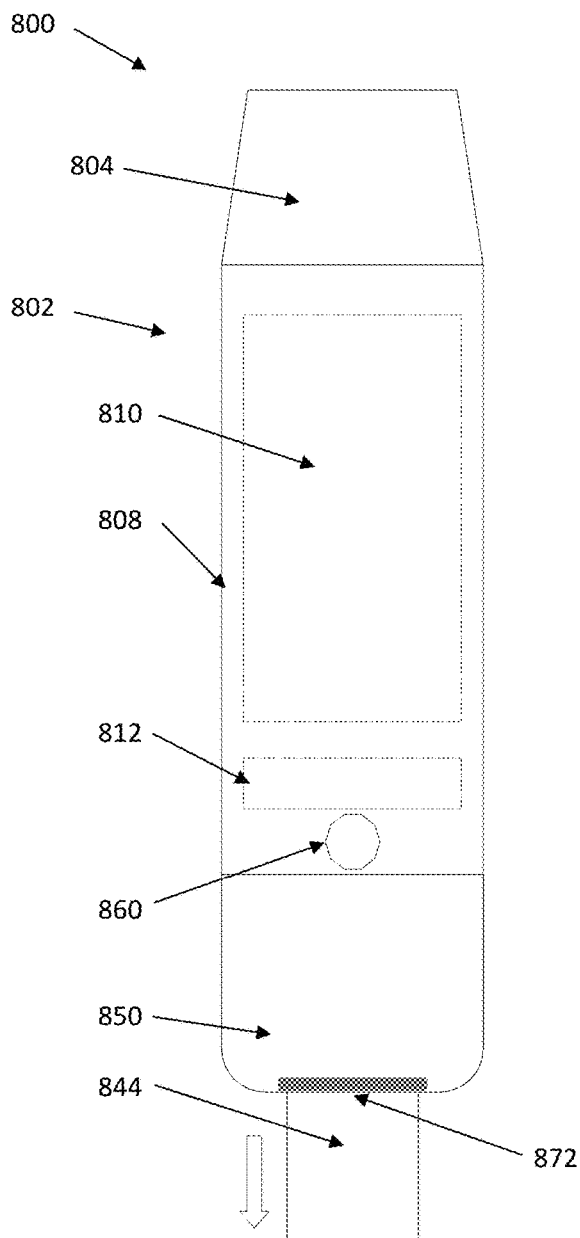
Figures 10A, 10B:
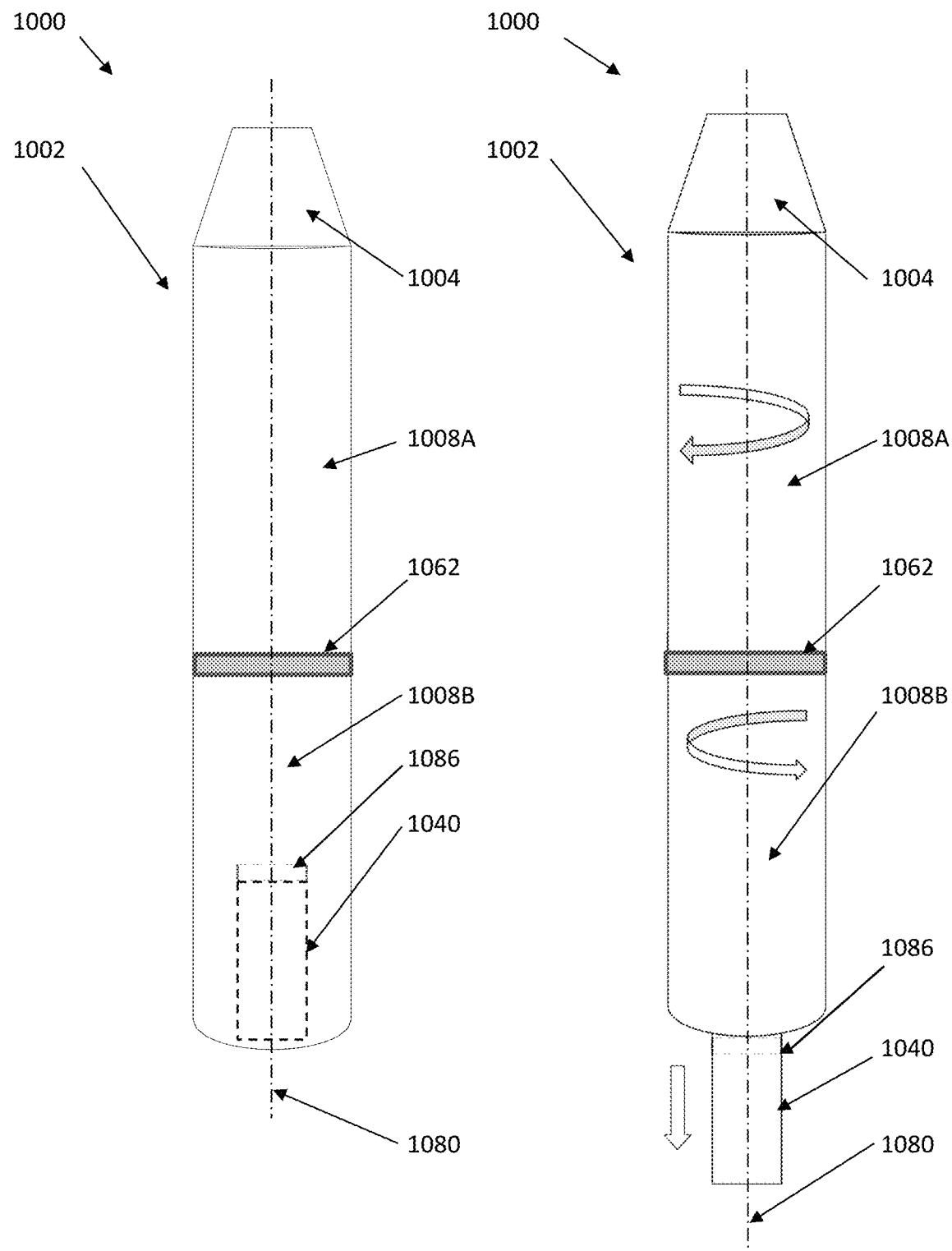
Figure 11A:
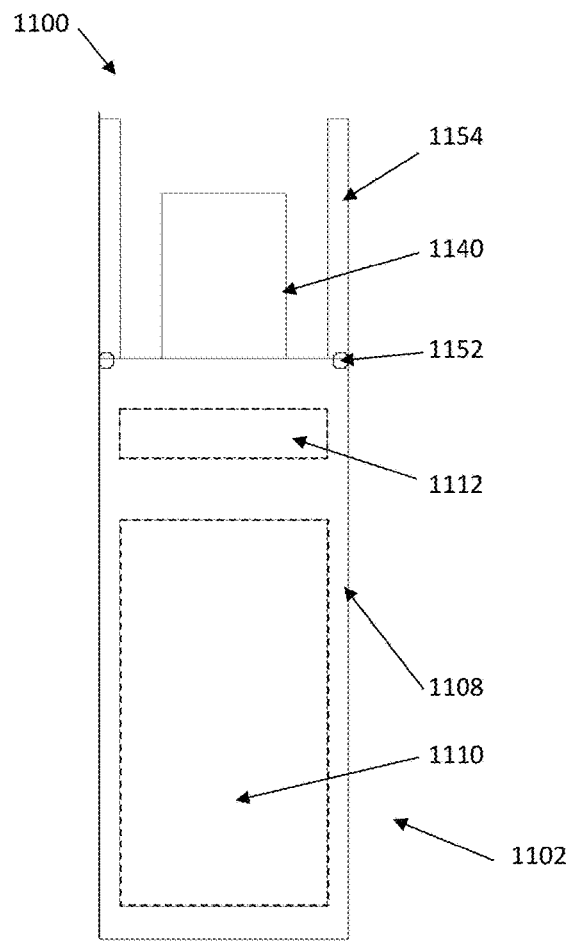
Figure 11B:
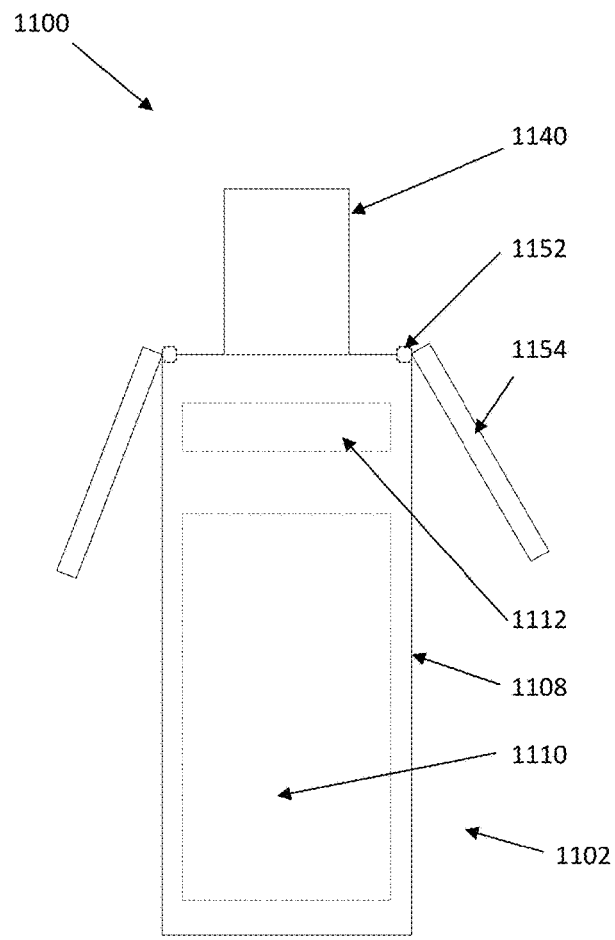
Figure 12A:
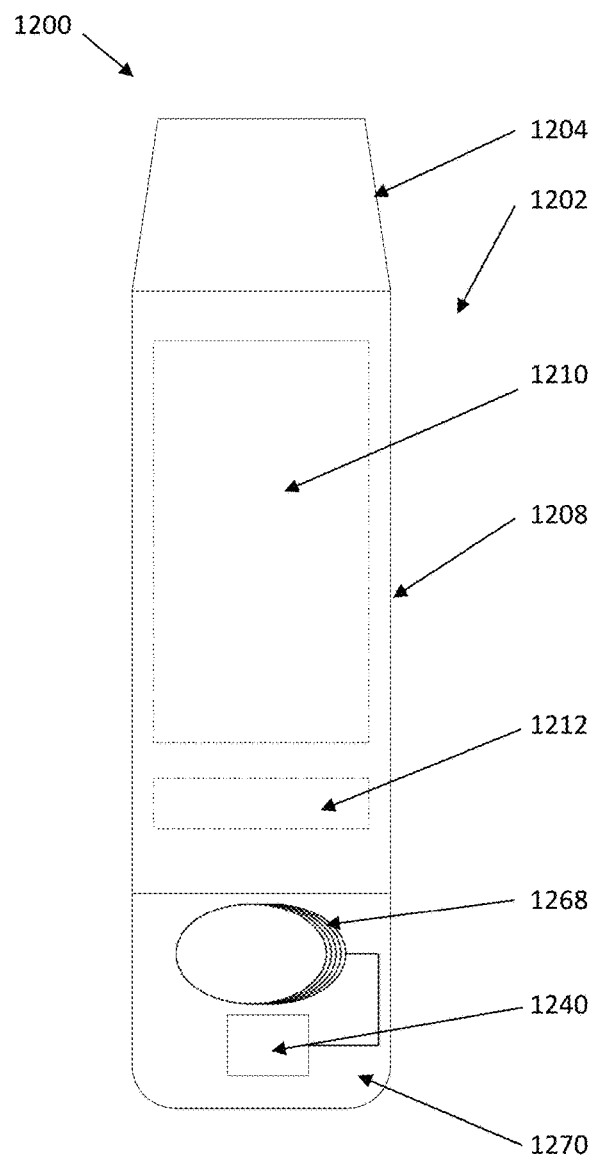
Figure 12B:
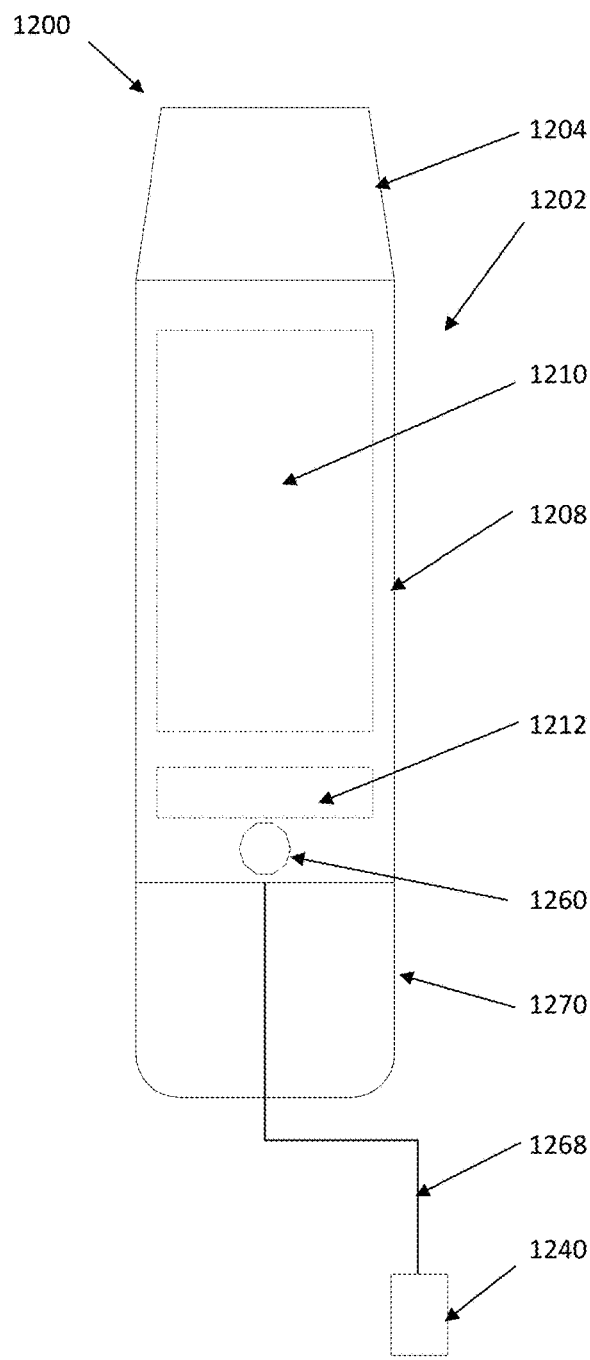
Figure 13:
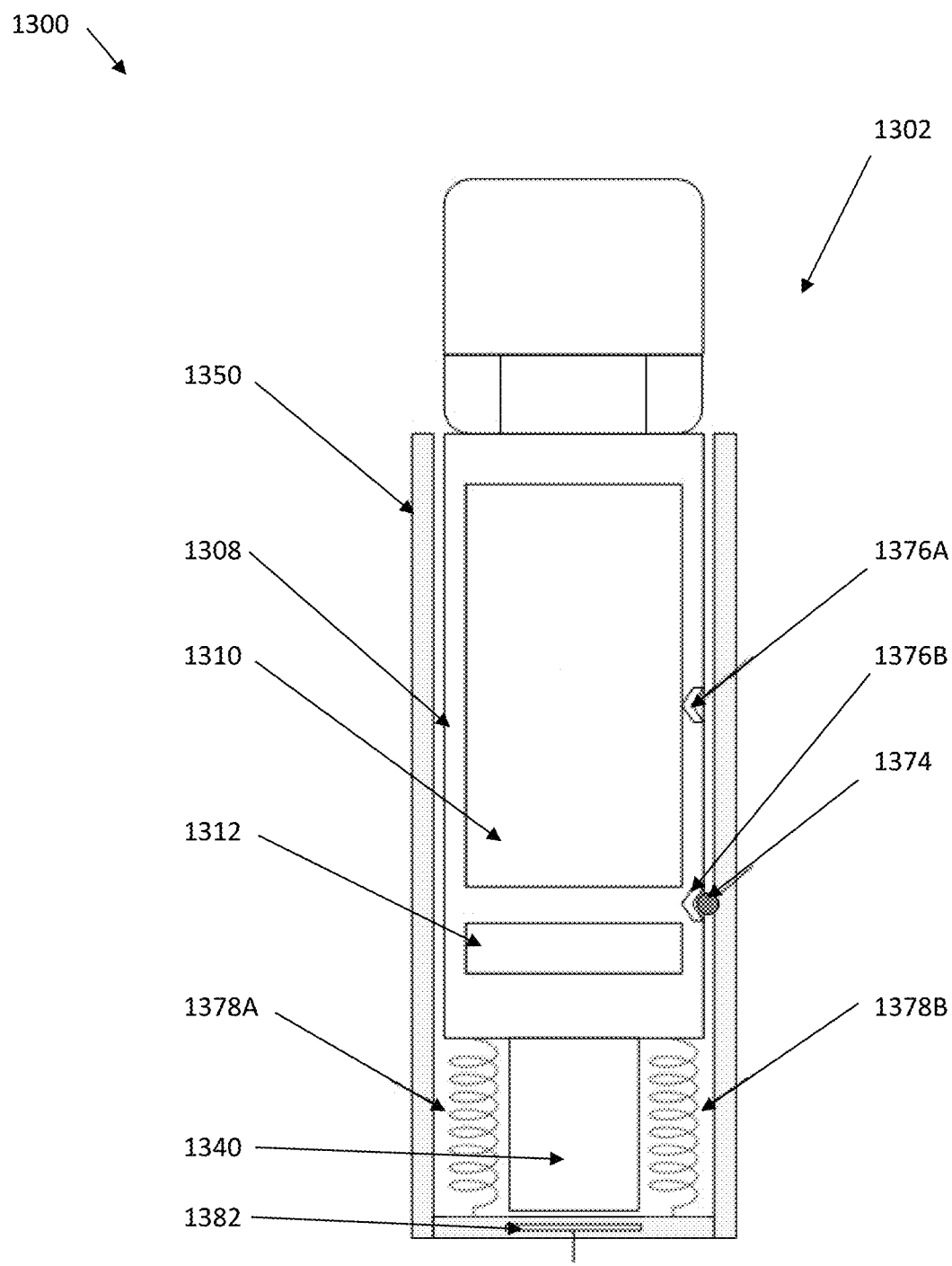

Having thus described aspects of the disclosure in the foregoing general terms, reference will now be made to the accompanying figures, which are not necessarily drawn to scale, and wherein:

FIG. 1 is a block diagram of an aerosol provision system according to some example implementations of the present disclosure;

FIGS. 2 and 3 illustrate an aerosol provision system in the form of a vapor product, according to some example implementations;

FIGS. 4A-4C illustrate an aerosol provision system with an integrated charger according to some example implementations of the present disclosure;

FIG. 5 illustrates another aerosol provision system with an integrated charger according to some example implementations of the present disclosure;

FIGS. 6A-6C illustrate another aerosol provision system with an integrated charger according to some example implementations of the present disclosure;

FIG. 7 illustrates another aerosol provision system with an integrated charger according to some example implementations of the present disclosure;

FIGS. 8A and 8B illustrate two states of an aerosol provision system with an integrated charger according to some example implementations of the present disclosure;

FIGS. 9A and 9B illustrate two states of another aerosol provision system with an integrated charger according to some example implementations of the present disclosure;

FIGS. 10A and 10B illustrate two states of another aerosol provision system with an integrated charger according to some example implementations of the present disclosure;

FIGS. 11A and 11B illustrate two states of another aerosol provision system with an integrated charger according to some example implementations of the present disclosure;

FIGS. 12A and 12B illustrate two states of another aerosol provision system with an integrated charger according to some example implementations of the present disclosure; and FIG. 13 illustrates another aerosol provision system with an integrated charger according to some example implementations of the present disclosure.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data,"

"content," "digital content," "information," and similar terms may be at times used interchangeably.

Example implementations of the present disclosure are generally directed to delivery systems designed to deliver at least one substance to a user, such as to satisfy a particular "consumer moment." The substance may include constituents that impart a physiological effect on the user, a sensorial effect on the user, or both.

Delivery systems may take many forms. Examples of suitable delivery systems include aerosol provision systems such as powered aerosol provision systems designed to release one or more substances or compounds from an aerosol-generating material without combusting the aerosol-generating material. These aerosol provision systems may at times be referred to as non-combustible aerosol provision systems, aerosol delivery devices or the like, and the aerosol-generating material may be, for example, in the form of a solid, semi-solid, liquid or gel and may or may not contain nicotine.

Examples of suitable aerosol provision systems include vapor products, heat-not-burn products, hybrid products and the like. Vapor products are commonly known as "electronic cigarettes," "e-cigarettes" or electronic nicotine delivery systems (ENDS), although the aerosol-generating material need not include nicotine. Many vapor products are designed to heat a liquid material to generate an aerosol. Other vapor products are designed to break up an aerosol-generating material into an aerosol without heating, or with only secondary heating. Heat-not-burn products include tobacco heating products (THPs) and carbon-tipped tobacco heating products (CTHPs), and many are designed to heat a solid material to generate an aerosol without combusting the material.

Hybrid products use a combination of aerosol-generating materials, one or a plurality of which may be heated. Each of the aerosol-generating materials may be, for example, in the form of a solid, semi-solid, liquid, or gel. Some hybrid products are similar to vapor products except that the aerosol generated from a liquid or gel aerosol-generating material passes through a second material (such as tobacco) to pick up additional constituents before reaching the user. In some example implementations, the hybrid system includes a liquid or gel aerosol-generating material, and a solid aerosol-generating material. The solid aerosol-generating material may include, for example, tobacco or a non-tobacco product.

FIG. 1 is a block diagram of an aerosol provision system 100 according to some example implementations. In various examples, the aerosol provision system may be a vapor product, heat-not-burn product or hybrid product. The aerosol provision system includes one or more of each of a number of components including, for example, an aerosol provision device 102, and a consumable 104 (sometimes referred to as an article) for use with the aerosol provision device. The aerosol provision system also includes an aerosol generator 106. In various implementations, the aerosol generator may be part of the aerosol provision device or the consumable. In other implementations, the aerosol generator may be separate from the aerosol provision device and the consumable, and removably engaged with the aerosol provision device and/or the consumable.

In various examples, the aerosol provision system 100 and its components including the aerosol provision device 102 and the consumable 104 may be reusable or single-use. In some examples, the aerosol provision system including both the aerosol provision device and the consumable may be single use. In some examples, the aerosol provision device may be reusable, and the consumable may be reusable (e.g., refillable) or single use (e.g., replaceable). In yet further examples, the consumable may be both refillable and also replaceable. In examples in which the aerosol generator 106 is part of the aerosol provision device or the consumable, the aerosol generator may be reusable or single-use in the same manner as the aerosol provision device or the consumable.

In some example implementations, the aerosol provision device 102 may include a housing 108 with a power source 110 and circuitry 112. The power source is configured to provide a source of power to the aerosol provision device and thereby the aerosol provision system 100. The power source may be or include, for example, an electric power source such as a non-rechargeable battery or a rechargeable battery, solid-state battery (SSB), lithium-ion battery, supercapacitor, or the like.

The circuitry 112 may be configured to enable one or more functionalities (at times referred to as services) of the aerosol provision device 102 and thereby the aerosol provision system 100. The circuitry includes electronic components, and in some examples one or more of the electronic components may be formed as a circuit board such as a printed circuit board (PCB).

In some examples, the circuitry 112 includes at least one switch 114 that may be directly or indirectly manipulated by a user to activate the aerosol provision device 102 and thereby the aerosol provision system 100. The switch may be or include a pushbutton, touch-sensitive surface or the like that may be operated manually by a user. Additionally or alternatively, the switch may be or include a sensor configured to sense one or more process variables that indicate use of the aerosol provision device or aerosol provision system. One example is a flow sensor, pressure sensor, pressure switch or the like that is configured to detect airflow or a change in pressure caused by airflow when a user draws on the consumable 104.

The switch 114 may provide user interface functionality. In some examples, the circuitry 112 may include a user interface (UI) 116 that is separate from or that is or includes the switch. The UI may include one or more input devices and/or output devices to enable interaction between the user and the aerosol provision device 102. As described above with respect to the switch, examples of suitable input devices include pushbuttons, touch-sensitive surfaces and the like. The one or more output devices generally include devices configured to provide information in a human-perceptible form that may be visual, audible or tactile/haptic. Examples of suitable output devices include light sources such as light-emitting diodes (LEDs), quantum dot-based LEDs and the like. Other examples of suitable output devices include display devices (e.g., electronic visual displays), touchscreens (integrated touch-sensitive surface and display device), loudspeakers, vibration motors and the like.

In some examples, the circuitry 112 includes processing circuitry 118 configured to perform data processing, application execution, or other processing, control or management services according to one or more example implementations. The processing circuitry may include a processor embodied in a variety of forms such as at least one processor core, microprocessor, coprocessor, controller, microcontroller or various other computing or processing devices including one or more integrated circuits such as, for example, an ASIC (application specific integrated circuit), an FPGA (field programmable gate array), some combination thereof, or the like. In some examples, the processing circuitry may include memory coupled to or integrated with the processor, and which may store data, computer program instructions executable by the processor, some combination thereof, or the like.

As also shown, in some examples, the housing 108 and thereby the aerosol provision device 102 may also include a coupler 120 and/or a receptacle 122 structured to engage and hold the consumable 104, and thereby couple the aerosol provision device with the consumable. The coupler may be or include a connector, fastener or the like that is configured to connect with a corresponding coupler of the consumable, such as by a press fit (or interference fit) connection, threaded connection, magnetic connection or the like. The receptacle may be or include a reservoir, tank, container, cavity, receiving chamber or the like that is structured to receive and contain the consumable or at least a portion of the consumable.

The consumable 104 is an article including aerosol-generating material 124 (also referred to as an aerosol precursor composition), part or all of which is intended to be consumed during use by a user. The aerosol provision system 100 may include one or more consumables, and each consumable may include one or more aerosol-generating materials. In some examples in which the aerosol provision system is a hybrid product, the aerosol provision system may include a liquid or gel aerosol-generating material to generate an aerosol, which may then pass through a second, solid aerosol-generating material to pick up additional constituents before reaching the user. These aerosol-generating materials may be within a single consumable or respective consumables that may be separately removable.

The aerosol-generating material 124 is capable of generating aerosol, for example when heated, irradiated or energized in any other way. The aerosol-generating material may be, for example, in the form of a solid, semi-solid, liquid or gel. The aerosol-generating material may include an "amorphous solid," which may be alternatively referred to as a "monolithic solid" (i.e., non-fibrous). In some examples, the amorphous solid may be a dried gel. The amorphous solid is a solid material that may retain some fluid, such as liquid, within it. In some examples, the aerosol-generating material may include from about 50 wt %, 60 wt % or 70 wt % of amorphous solid, to about 90 wt %, 95 wt % or 100 wt % of amorphous solid.

The aerosol-generating material 124 may include one or more of each of a number of constituents such as an active substance 126, flavorant 128, aerosol-former material 130 or other functional material 132.

The active substance 126 may be a physiologically active material, which is a material intended to achieve or enhance a physiological response such as improved alertness, improved focus, increased energy, increased stamina, increased calm or improved sleep. The active substance may for example be selected from nutraceuticals, nootropics, psychoactives. The active substance may be naturally occurring or synthetically obtained. The active substance may include, for example, nicotine, caffeine, GABA (γ-aminobutyric acid), L-theanine, taurine, theine, vitamins such as B6 or B12 (cobalamin) or C, melatonin, cannabinoids, terpenes, or constituents, derivatives, or combinations thereof. The active substance may include one or more constituents, derivatives or extracts of tobacco, cannabis or another botanical.

In some examples in which the active substance 126 includes derivatives or extracts, the active substance may be or include one or more cannabinoids or terpenes.

As noted herein, the active substance 126 may include or be derived from one or more botanicals or constituents, derivatives or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may include an active compound naturally existing in a botanical, obtained synthetically. The material may be in the form of liquid, gas, solid, powder, dust, crushed particles, granules, pellets, shreds, strips, sheets, or the like. Example botanicals are tobacco, eucalyptus, star anise, hemp, cocoa, cannabis, fennel, lemongrass, peppermint, spearmint, rooibos, chamomile, flax, ginger, ginkgo biloba, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. The mint may be chosen from the following mint varieties: Mentha Arventis, Mentha c.v., Mentha niliaca, Mentha piperita, Mentha piperita citrata c.v., Mentha piperita c.v, Mentha spicata crispa, Mentha cardifolia, Mentha longifolia, Mentha suaveolens variegata, Mentha pulegium, Mentha spicata c.v. and Mentha suaveolens.

In yet other examples, the active substance 126 may be or include one or more of 5-hydroxytryptophan (5-HTP)/oxitriptan/Griffonia simplicifolia, acetylcholine, arachidonic acid (AA, omega-6), ashwagandha (Withania somnifera), Bacopa monniera, beta alanine, beta-hydroxy-beta-methyl-butyrate (HMB), Centella asiatica, chai-hu, cinnamon, citicoline, cotinine, creatine, curcumin, docosahexaenoic acid (DHA, omega-3), dopamine, Dorstenia arifolia, Dorstenia Odorata, essential oils, GABA, Galphimia glauca, glutamic acid, hops, kaempferia parviflora (Thai ginseng), kava, L-carnitine, L-arginine, lavender oil, L-choline, liquorice, L-lysine, L-theanine, L-tryptophan, lutein, magnesium, magnesium L-threonate, myo-inositol, nardostachys chinensis, nitrate, oil-based extract of Viola odorata, oxygen, phenylalanine, phosphatidylserine, quercetin, resveratrol, Rhizoma gastrodiae, Rhodiola, Rhodiola rosea, rose essential oil, S-adenosylmethionine (SAMe), sceletium tortuosum, schisandra, selenium, serotonin, skullcap, spearmint extract, spikenard, theobromine, tumaric, Turnera aphrodisiaca, tyrosine, vitamin A, vitamin B3, or yerba mate.

In some example implementations, the aerosol-generating material 124 includes a flavorant 128. As used herein, the terms "flavorant" and "flavor" refer to materials which, where local regulations permit, may be used to create a desired taste, aroma or other somatosensorial sensation in a product for adult consumers. Flavorants may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, redberry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus Mentha, eucalyptus, star anise, cocoa, lemongrass, rooibos, flax, ginkgo biloba, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. Flavorants may be imitation, synthetic or natural ingredients or blends thereof. Flavorants may be in any suitable form, for example, liquid such as an oil, solid such as a powder, or gas.

In some example implementations, the flavorant 128 may include a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

The aerosol-former material 130 may include one or more constituents capable of forming an aerosol. In some example implementations, the aerosol-former material may include one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional materials 132 may include one or more of pH regulators, coloring agents, preservatives, binders, fillers, stabilizers, and/or antioxidants. Suitable binders include, for example, pectin, guar gum, fruit pectin, citrus pectin, tobacco pectin, hydroxyethyl guar gum, hydroxypropyl guar gum, hydroxyethyl locust bean gum, hydroxypropyl locust bean gum, alginate, starch, modified starch, derivatized starch, methyl cellulose, ethyl cellulose, ethylhydroxymethyl cellulose, carboxymethyl cellulose, tamarind gum, dextran, pullalon, konjac flour or xanthan gum.

In some example implementations, the aerosol-generating material 124 may be present on or in a support to form a substrate 134. The support may be or include, for example, paper, card, paperboard, cardboard, reconstituted material (e.g., a material formed from reconstituted plant material, such as reconstituted tobacco, reconstituted hemp, etc.), a plastics material, a ceramic material, a composite material, glass, a metal, or a metal alloy. In some examples, the support includes a susceptor, which may be embedded within the aerosol-generating material, or on one or either side of the aerosol-generating material.

Although not separately shown, in some example implementations, the consumable 104 may further include receptacle structured to engage and hold the aerosol-generating material 124, or substrate 134 with the aerosol-generating material. The receptacle may be or include a reservoir, tank, container, cavity, receiving chamber or the like that is structured to receive and contain the aerosol-generating material or the substrate. The consumable may include an aerosol-generating material transfer component (also referred to as a liquid transport element) configured to transport aerosol-generating material to the aerosol generator 106. The aerosol-generating material transfer component may be adapted to wick or otherwise transport aerosol-generating material via capillary action. In some examples, the aerosol-generating material transfer component may include a microfluidic chip, a micro pump or other suitable component to transport aerosol-generating material.

The aerosol generator 106 (also referred to as an atomizer, aerosolizer, aerosol production component, or heating assembly) is configured to energize the aerosol-generating material 124 to generate an aerosol, or otherwise cause generation of an aerosol from the aerosol-generating material. More particularly, in some examples, the aerosol generator may be powered by the power source 110 under control of the circuitry 112 to energize the aerosol-generating material to generate an aerosol.

In some example implementations, the aerosol generator 106 is an electric heater configured to perform electric heating in which electrical energy from the power source is converted to heat energy, which the aerosol-generating material is subject to so as to release one or more volatiles from the aerosol-generating material to form an aerosol. Examples of suitable forms of electric heating include resistance (Joule) heating, induction heating, dielectric and microwave heating, radiant heating, arc heating and the like. More particular examples of suitable electric heaters include resistive heating elements such as wire coils, flat plates, prongs, micro heaters or the like.

In some example implementations, the aerosol generator 106 is configured to cause an aerosol to be generated from the aerosol-generating material without heating, or with only secondary heating. For example, the aerosol generator may be configured to subject the aerosol-generating material to one or more of increased pressure, vibration, or electrostatic energy. More particular examples of these aerosol generators include jet nebulizers, ultrasonic wave nebulizers, vibrating mesh technology (VMT) nebulizers, surface acoustic wave (SAW) nebulizers, and the like.

A jet nebulizer is configured to use compressed gas (e.g., air, oxygen) to break up aerosol-generating material 124 into an aerosol, and an ultrasonic wave nebulizer is configured to use ultrasonic waves to break up aerosol-generating material into an aerosol. A VMT nebulizer includes a mesh, and a piezo material (e.g., piezoelectric material, piezomagnetic material) that may be driven to vibrate and cause the mesh to break up aerosol-generating material into an aerosol. A SAW nebulizer is configured to use surface acoustic waves or Rayleigh waves to break up aerosol-generating material into an aerosol.

In some examples, the aerosol generator 106 may include a susceptor, or the susceptor may be part of the substrate 134. The susceptor is a material that is heatable by penetration with a varying magnetic field generated by a magnetic field generator that may be separate from or part of the aerosol generator. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor in some examples may be both electrically-conductive and magnetic, so that the susceptor of these examples is heatable by both heating mechanisms.

Although not separately shown, either or both the aerosol provision device 102 or the consumable 104 may include an aerosol-modifying agent. The aerosol-modifying agent is a substance configured to modify the aerosol generated from the aerosol-generating material 124, such as by changing the taste, flavor, acidity or another characteristic of the aerosol. In various examples, the aerosol-modifying agent may be an additive or a sorbent. The aerosol-modifying agent may include, for example, one or more of a flavorant, colorant, water or carbon adsorbent. The aerosol-modifying agent may be a solid, semi-solid, liquid or gel. The aerosol-modifying agent may be in powder, thread or granule form. The aerosol-modifying agent may be free from filtration material. In some examples, the aerosol-modifying agent may be provided in an aerosol-modifying agent release component, that is operable to selectively release the aerosol-modifying agent.

For further detail regarding example implementations of an aerosol provision system, see U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 5,954,979 to Counts et al.; U.S. Pat. No. 7,040,314 to Nguyen et al.; U.S. Pat. No. 7,726,320 to Robinson et al.; U.S. Pat. No. 8,365,742 to Hon; U.S. Pat. No. 8,402,976 to Fernando et al.; U.S. Pat. No. 9,078,473 to Worm et al.; U.S. Pat. No. 9,220,301 to Banerjee et al.; U.S. Pat. No. 10,226,073 to Bless et al.; and 10,314,334 to Ademe; U.S. Pat. App. Pub. Nos. 2014/0060554 to Collet et al., and 2014/0270727 to Ampolini et al., all of which are also incorporated herein by reference.

The aerosol provision system 100 and its components including the aerosol provision device 102, consumable 104, and aerosol generator 106 may be manufactured with any of a number of different form factors, and with additional or alternative components relative to those described above.

FIGS. 2 and 3 illustrate an aerosol provision system 200 in the form of a vapor product, and that in some example implementations may correspond to the aerosol provision system 100. As shown, the aerosol provision system 200 may include an aerosol provision device 202 (also referred to as a control body or power unit) and a consumable 204 (also referred to as a cartridge or tank), which may correspond to respectively the aerosol provision device 102 and the consumable 104. The aerosol provision system and in particular the consumable may also include an aerosol generator corresponding to the aerosol generator 106, and in the form of an electric heater 306 such as a heating element like a metal wire coil configured to convert electrical energy to heat energy through resistance (Joule) heating. The aerosol provision device and the consumable can be permanently or detachably aligned in a functioning relationship. FIGS. 2 and 3 illustrate respectively a perspective view and a partially cut-away side view of the aerosol provision system in a coupled configuration.

As seen in FIG. 2 and the cut-away view illustrated in FIG. 3, the aerosol provision device 202 and consumable 204 each include a number of respective components. The components illustrated in FIG. 3 are representative of the components that may be present in an aerosol provision device and consumable and are not intended to limit the scope of components that are encompassed by the present disclosure.

The aerosol provision device 202 may include a housing 208 (sometimes referred to as an aerosol provision device shell) that may include a power source 310. The housing may also include circuitry 312 with a switch in the form of a sensor 314, a user interface including a light source 316 that may be illuminated with use of the aerosol provision system 200, and processing circuitry 318 (also referred to as a control component). The housing may also include a receptacle in the form of a consumable receiving chamber 322 structured to engage and hold the consumable 204. And the consumable may include an aerosol-generating material 324 that may correspond to aerosol-generating material 124, and that may include one or more of each of a number of constituents such as an active substance, flavorant, aerosol-former material or other functional material. The housing may also include a removable cap 250 attached to a distal end thereof.

As also seen in FIG. 3, the aerosol provision device 202 may also include electrical connectors 336 positioned in the consumable receiving chamber 322 configured to electrically couple the circuitry and thereby the aerosol provision device with the consumable 204, and in particular electrical contacts 338 on the consumable. In this regard, the electrical connectors and electrical contacts may form a connection interface of the aerosol provision device and consumable. As also shown, the aerosol provision device may include an external electrical connector, such as a charging component 340 disposed beneath the removable cap 250, to connect the aerosol provision device with one or more external devices, such as a power source. Examples of suitable external electrical connectors include USB connectors, proprietary connectors such as Apple's Lightning connector, and the like.

In various examples, the consumable 204 includes a tank portion and a mouthpiece portion. The tank portion and the mouthpiece portion may be integrated or permanently fixed together, or the tank portion may itself define the mouthpiece portion (or vice versa). In other examples, the tank portion and the mouthpiece portion may be separate and removably engaged with one another.

The consumable 204, tank portion and/or mouthpiece portion may be separately defined in relation to a longitudinal axis (L), a first transverse axis (T1) that is perpendicular to the longitudinal axis, and a second transverse axis (T2) that is perpendicular to the longitudinal axis and is perpendicular to the first transverse axis. The consumable can be formed of a housing 242 (sometimes referred to as the consumable shell) enclosing a reservoir 344 (in the tank portion) configured to retain the aerosol-generating material 324. In some examples, the consumable may include an aerosol generator, such as electric heater 306 in the illustrated example. In some examples, the electrical connectors 336 on the aerosol provision device 202 and electrical contacts 338 on the consumable may electrically connect the electric heater with the power source 310 and/or circuitry 312 of the aerosol provision device.

As shown, in some examples, the reservoir 344 may be in fluid communication with an aerosol-generating material transfer component 346 adapted to wick or otherwise transport aerosol-generating material 324 stored in the reservoir housing to the electric heater 306. At least a portion of the aerosol-generating material transfer component may be positioned proximate (e.g., directly adjacent, adjacent, in close proximity to, or in relatively close proximity to) the electric heater. The aerosol-generating material transfer component may extend between the electric heater and the aerosol-generating material stored in the reservoir, and at least a portion of the electric heater may be located above a proximal end the reservoir. For the purposes of the present disclosure, it should be understood that the term "above" in this particular context should be interpreted as meaning toward a proximal end of the reservoir and/or the consumable 204 in direction substantially along the longitudinal axis (L). Other arrangements of the aerosol-generating material transfer component are also contemplated within the scope of the disclosure. For example, in some example implementations, the aerosol-generating material transfer component may be positioned proximate a distal end of the reservoir and/or arranged transverse to the longitudinal axis (L).

The electric heater 306 and aerosol-generating material transfer component 346 may be configured as separate elements that are fluidly connected, the electric heater and aerosol-generating material transfer component or may be configured as a combined element. For example, in some implementations an electric heater may be integrated into an aerosol-generating material transfer component. Moreover, the electric heater and the aerosol-generating material transfer component may be formed of any construction as otherwise described herein. In some examples, a valve may be positioned between the reservoir 344 and electric heater, and configured to control an amount of aerosol-generating material 324 passed or delivered from the reservoir to the electric heater.

An opening 348 may be present in the housing 242 (e.g., at the mouth end of the mouthpiece portion) to allow for egress of formed aerosol from the consumable 204.

As indicated above, the circuitry 312 of the aerosol provision device 202 may include a number of electronic components, and in some examples may be formed of a circuit board such as a PCB that supports and electrically connects the electronic components. The sensor 314 (switch) may be one of these electronic components positioned on the circuit board. In some examples, the sensor may comprise its own circuit board or other base element to which it can be attached. In some examples, a flexible circuit board may be utilized. A flexible circuit board may be configured into a variety of shapes. In some examples, a flexible circuit board may be combined with, layered onto, or form part or all of a heater substrate.

In some examples, the reservoir 344 may be a container for storing the aerosol-generating material 324. In some examples, the reservoir may be or include a fibrous reservoir with a substrate with the aerosol-generating material present on or in a support. For example, the reservoir can comprise one or more layers of nonwoven fibers substantially formed into the shape of a tube encircling the interior of the housing 242, in this example. The aerosol-generating material may be retained in the reservoir. Liquid components, for example, may be sorptively retained by the reservoir. The reservoir may be in fluid connection with the aerosol-generating material transfer component 346. The aerosol-generating material transfer component may transport the aerosol-generating material stored in the reservoir via capillary action—or via a micro pump—to the electric heater 306. As such, the electric heater is in a heating arrangement with the aerosol-generating material transfer component.

In use, when a user draws on the aerosol provision system 200, airflow is detected by the sensor 314, and the electric heater 306 is activated to energize the aerosol-generating material 324 to generate an aerosol. Drawing upon the mouth end of the aerosol provision system causes ambient air to enter and pass through the aerosol provision system. In the consumable 204, the drawn air combines with the aerosol that is whisked, aspirated or otherwise drawn away from the electric heater and out the opening 348 in the mouth end of the aerosol provision system.

Again, as shown in FIGS. 2 and 3, the aerosol generator of the aerosol provision system 200 is an electric heater 306 designed to heat the aerosol-generating material 324 to generate an aerosol. In other implementations, the aerosol generator is designed to break up the aerosol-generating material without heating, or with only secondary heating.

As described above, hybrid products use a combination of aerosol-generating materials, and some hybrid products are similar to vapor products except that the aerosol generated from one aerosol-generating material may pass through a second aerosol-generating material to pick up additional constituents. Another similar aerosol provision system in the form of a hybrid product may therefore be constructed similar to the vapor product in FIGS. 2 and 3 (with an electric heater 306 or a nebulizer). The hybrid product may include a second aerosol-generating material through which aerosol from the aerosol-generating material 324 is passed to pick up additional constituents before passing through the opening 348 in the mouth end of the aerosol provision system.

For further detail regarding example implementations of an aerosol provision system in the form of a vapor product or hybrid product, see U.S. Pat. No. 4,947,874 to Brooks et al.; U.S. Pat. No. 7,040,314 to Nguyen et al.; and U.S. Pat. No. 9,078,473 to Worm et al.; U.S. Pat. App. Pub. Nos. 2009/0230117 to Fernando et al., 2014/0060554 to Collet et al., 2015/0257445 to Henry et al.; 2013/0192623 to Tucker et al.; 2013/0298905 to Leven et al.; 2014/0000638 to Sebastian et al., 2014/0261495 to Novak et al., and 2014/0261408 to DePiano et al., all of which are also incorporated herein by reference.

FIGS. 4A-4C are schematic plan views of one example implementation of an aerosol provision system 400, such as those described above, but shown in a simplified form and with an integrated charger. As previously described, the system 400 includes an aerosol provision device 402 (again, also referred to as a control body or power unit) and a consumable 404 (again, also referred to as a cartridge or tank), each of which include a number of respective components, which can be permanently or detachably aligned in a functioning relationship. Generally, the consumable 404 depicted conforms with the various consumables 104, 204 described hereinabove insofar as it includes such components as a mouthpiece and an aerosol-generating material that may include one or more of each of a number of constituents such as an active substance, flavorant, aerosol-former material or other functional material. However, the consumable 404 may be modified as described in further detail below to accommodate the integrated charger 440. Similarly, the aerosol provision device 402 will also generally conform with the devices 102, 202 described above insofar as it includes such components as a housing, a power source, circuitry, and a receptacle in the form of a consumable receiving chamber structured to engage and hold the consumable 404. The aerosol provision device 402 may also be modified as described below to accommodate the integrated charger 440.

The aerosol provision device 402 shown in FIGS. 4A and 4B includes a power source 410, integrated charging circuitry 412, an outer housing 408, electrodes that interface with the consumable 404, and a charging component 440. In FIG. 4A, the device 402 is shown with a cap 450 removably secured to a distal end of the housing 408 and enclosing the charging component 440. In FIG. 4B, the cap 450 has been removed from the distal end of the device 402 and is removably secured to a proximal end of the device 402 (e.g., coupled to the mouthpiece component of the consumable 404), thereby exposing the charging component 440 for use. The cap 450 is described in greater detail below with respect to FIG. 4C. The cap 450 may be secured to the device 402 via, for example, a snap or interference fit, threaded engagement, magnetic force, or other geometric interlocking features. Additionally, the cap 450 and/or the device 402 may be configured to give a user-perceivable feedback when the cap 450 is securely attached to the device 402 (e.g., in a closed position). In various implementations, the feedback mechanism 480 provide the user with an audible click or snap, a tactile feedback (e.g., vibration), and/or a visible light that blinks or flashes in a pattern to let the user know the cap 450 was successfully closed.

The charging component 440 is configured to interface directly with an external power source 490 insofar as no intervening connection, electrical transmission cable, power cord, or the like is required between the device 402 and the power source 490. The exact structure of the external power source 490 may vary, but generally, the external power source 490 is a device that is hardwired, such as an electrical outlet hardwired to an electrical grid, a USB port on a computer that is hardwired to an internal battery, or a standalone battery back-up; any of which the charging connection 440 can directly interface with.

In some implementations, the charging component 440 incorporates a male-end USB charging port that is attached, either removably or fixedly, to the housing 408 of the device 402. When the power source 410 (e.g., a battery) is depleted and needs recharging, the cap 450 can be removed to expose the charging component 440. The component 440 may extend from the end opposing the consumable 404; however, the component 440 may also extend from the front or rear planes, either side plane, or be angled to a degree other than normal to the plane, as described in greater detail below. Various other charging components may be used, such as, for example, any USB 2.0 or 3.0 connection, including type A, type B, type C, mini USB, micro USB, any known or later developed 5V connector, or even a standard 2-prong AC wall plug, either alone or in any combination to suit a particular application. Any of these charging components may be attached to the housing 408 and covered with the cap 450; however, using different types of charging components will influence the final geometry of the cap 450 and features used to removably attach the cap 450 to the consumable 404 while charging.

As shown in FIG. 4C, the cap 450 may also contain a flow-tube 448 that allows aerosol to pass though when it is attached to the mouth-end piece of the consumable 404. The flow-tube 448 in the cap allows the user to still use the system 400 while charging (e.g., vape-while-charging) and provides a barrier between the user and the mouthpiece of the device. In some implementations, the cap 450 acts as a second mouthpiece for, for example, sharing the system 400 between multiple users and/or giving a user a choice with respect to the style mouthpiece they want to use (e.g., the cap 450 may have a different shape, material, color, texture, etc. as compared to the mouthpiece on the consumable). Additionally, the flow-tube 448 may include a reservoir 428 or other mechanism for imparting sensory characteristics to the primary aerosol stream. For example, the reservoir 428 may contain liquid flavoring material that is adsorbed to a substrate, the substrate being porous and absorbent to prevent the flavoring material from moving in any orientation of the device 402 through which the primary aerosol passes and absorbs some flavor prior to exiting the cap 450. The flavoring material may be solid-state such that an absorbent material is not required. Examples of flavoring materials are described hereinabove.

FIG. 5 depicts an implementation of a system 500 similar to the system 400 of FIGS. 4A-4C, insofar as it includes an aerosol provision device 502 and a consumable 504 similar to those described hereinabove, and where the device 502 includes a power source 510, integrated circuitry 512, an outer housing 508, electrodes that interface with the consumable 504, and a charging component 540. However, in this implementation, the cap 550 is attached to the housing 508 via a hinge mechanism 552, such that the cap 550 is configured to rotate about the hinge mechanism 552 when force is applied by the user to expose the charging component 540. In various implementations, the hinge mechanism 552 may be spring-loaded to maintain the cap 550 in the open position until the cap is manually closed by the user. The housing 508 may further include a feedback mechanism 580, such as those described hereinabove or other type of locking mechanism (e.g., a snap fit) to hold the cap 550 in the closed position until the force is applied by the user. The hinge mechanism 552 will be selected to suit a particular application and may include, for example, a piano hinge, a butt hinge, a barrel hinge, a scissor hinge, a flush hinge, a pivot hinge, or similar mechanism that allows the cap 550 to pivot relative to the housing 508. The hinge mechanism 552 may be oriented such that most, if not all, of the mechanism 552 is disposed within the interiors of the housing 508 and cap 550 so as to be virtually invisible. The mechanism 552 may be attached to the housing via bonding (e.g., adhesive or soldering) or mechanical fasteners (e.g., screws or rivets). In certain implementations, a length of the outer housing 408, 508, etc. may be extended to accommodate the charging component 440, 540, etc., while in others, the power source 410, 510, etc. may be reduced in size to accommodate the charging component in a "standard" housing.

FIGS. 6A and 6B depict an implementation of an aerosol provision system 600 where the charging component 640 is integrated into the mouthpiece end of the device 602. As with the implementations of FIGS. 4A-C and 5, the device 602 and consumable 604 are similar to those described hereinabove; however, a portion of the consumable 604 is modified so as to interface with the charging component 640. In this implementation, the charging component 640 is used to both charge the power source 610 inside the device 602 and discharge the power source 610 to the heater inside the cartridge 604.

As shown in FIG. 6A, the relative placement of the power source and the integrated charging circuitry 612 within the housing 608 has been reversed; however, the actual placement of the various components within the housing may vary to suit a particular application and are merely provided here for illustrative purposes. As further shown in FIG. 6A, the charging component 640 is disposed at the proximal or mouthpiece end of the device 602 within a portion 654 of the housing 608, where this portion 654 may be a sheath or sleeve that is movable relative to the rest of the housing 608 and/or the charging component 640 so as to expose the charging component 640 for use, as described in greater detail below.

The configuration of the charging component 640 can be any of configurations described herein. In this implementation, the charging component 640 mates with a corresponding port on the cartridge/consumable 604, which contains an aerosol precursor, a flow-tube, a mouthpiece, and heater with integrated circuitry, where the integrated circuitry incorporates a female-end USB connection port 656 with ground and power pins only. When the cartridge 604 is inserted into the device 602, the pins in the female-end USB connection port 656 interface with the male-end charging component 640 in the device 602 to complete the circuit and allow current to flow from the power source 610 to the heater. The male-end charging component 640 may contain a plurality of connections, for example, ground and power leads for charging along with positive and negative leads for discharging to the cartridge 604. In some implementations, the male-end charging component 640 could also only contain ground and power leads that are used to both charge the power source 610 as well as discharge the power source 610 to power the heater. Additionally, when inserting the cartridge 604 into the device 602, the mouthpiece portion of the cartridge 604 may include a mechanism for attaching to the housing 608 (or portion 654 thereof) and/or a feedback mechanism, not shown but similar to as those described herein.

FIG. 6C depicts an alternative implementation of a heater and circuitry for placement inside the cartridge 604, where the heater and circuitry are a single component 606. In one example, the component 606 is a silica chip with a flat, resistive heater trace 658 printed on one surface and with non-resistive leads 656 extending from the same surface to the edge of the chip and configured to interface with the ground and power pins of the charging component 640 when the cartridge is inserted into the device 602. Alternatively, the cartridge 604 may connect to the charging component 640 in the device by utilizing two (2) conductive pins extending from the base of the cartridge and configured to interface with the ground and power connections of the charging component 640. These pins are soldered to the conductive leads extending from the heater inside the cartridge. In the above implementations, the cartridge 604 acts as a cap to cover the of the charging component 640.

FIG. 7 depicts an implementation where the system 700 includes two (2) charging components 740A, 740B extending from different faces of the device, such as the distal and proximal ends of the device 702, either of which can be a charging end or a mouthpiece end. The system 700 shown in FIG. 7 is similar to the system 600 of FIGS. 6A and 6B and the basic description of the system 700 will not be repeated.

In one example, a distal end of the device 702 is configured to receive power to charge the internal power source 710 (i.e., the cartridge 704B is removed to expose the charging component 740B), while the mouthpiece end port is configured to deliver current to the heater contained inside the cartridge 704A (i.e., the cartridge 704A is installed in the device 702). A second 'spare' cartridge 704B will act as a cap to cover the distal charging component 740B when not in use. In this implementation, the two (2) charging components 740A, 740B provide the ability to alternate between charging the power source 710 and powering the heaters within the cartridges 704A, 704B. More specifically, the user may simultaneously power both two cartridges 704A, 704B, charge from either end, or charge from one end and discharge to a cartridge on the opposite end simultaneously (i.e., vape-while-charging). Additionally, this configuration would allow two users to use the device 702 at the same time or one user to merely rotate the device 180° to switch from one cartridge to another. The cartridges 704A, 704B may contain different flavors, active substances, levels of active materials, etc. that provide a user with different sensory experiences.

FIGS. 8A and 8B depict another implementation of an aerosol provision system 800 including an aerosol provision device 802 and a consumable/cartridge 804 similar to those previously described. In FIG. 8A the charging component 840 is shown in a first position (also referred to as a retracted or closed position), while in FIG. 8B, the charging component 840 is shown in a second position (also referred to as an extended or open position) where the charging component 840 has been deployed for use thereof. In this implementation, the housing 808 includes a cap 850, which may also take the form of a sheath or sleeve, that at least partially encloses the charging component 840 when not in use and is configured to pass the charging component therethrough in response to the actuation of a deployment mechanism. Specifically, the charging component 840 is retractable relative to the housing so as to be hidden when the aerosol provision device 802 is not in charging state. When the power source 810 is depleted and charging is required, the user performs an action to eject the charging component 840. In some implementations, the deployment mechanism 860 may be a push button or sliding mechanism directly or indirectly coupled to, for example, a sliding mechanism disposed within the housing 808 and mechanically coupled thereto or to the power source 810. The charging component 840 is also electrically coupled to the power source 810.

In one example, the charging component 840 is coupled to a spring-loaded sliding rail including a holding pin configured to prevent ejection until the user is ready for charging. When the actuator 860 is triggered (e.g., a push button is depressed), the holding pin is moved out of the slide path of the charging component 840, allowing the loaded spring to move the charging component 840 into the extended position. Once charging is complete, the user pushes the charging component 840 back inside the device 802, loading the spring and allowing the holding pin to reset when the charging component 840 is pushed completely inside the device to its starting position.

Alternatively, the charging component 840 may be permanently attached to a sliding member with a tab or handle that is exposed externally to the housing 808 (e.g., via a slot). The sliding member is configured in a position such that the user can move the charging component 840 via the sliding tab from a retracted starting position to an extended position when charging is required. The user uses the sliding tab to manually retract the charging component 840 when charging is completed. The sliding member and/or housing may include a detent or similar mechanism to hold the charging component 840 in either the extended or retracted position. In another implementation, the deployment mechanism may utilize an "ink pen-like" stroke to extend and retract the charging component 840. In various implementations of the system 800, the device 802 may include a feedback mechanism, such as those described above to indicate to the user that the charging component 840 has been moved completely to either the retracted or extended position.

Additionally, the cap 850 may include an opening and flap arrangement 872 at a distal end thereof. The flap covers the opening required for the charging component 840 to pass through when extended. The flap 872 closes the opening when the charging component 840 is retracted inside the cap 850. The covering flap may be attached to the cap 850 with a hinge and rotate internally or externally to the device when the charging component 840 is moving from the retracted position to the ejected position as described above. Specifically, when the charging component 840 moves into the opening, mechanical force moves the flap 872 out of the slide path, allowing the charging component 840 to move freely outside of the cap 850. Conversely, the flap is rotated into its original position when the charging component 840 is retracted back inside the cap 850. In some implementations, the flap may be spring loaded to automatically return to its original position. Additionally, the flap may be formed from two (2) interfacing plastic brushes that are flexible enough to allow the charging component 840 to move through, but stiff enough to maintain an adequate seal when the charging component 840 is retracted. Alternatively, the brushes could be made of a rubber material that acts similarly, for example, two rubber flaps that allow the charging component 840 to eject, but return to a sealed position when the charging component 840 is retracted.

FIGS. 9A and 9B depict an implementation of a system 900 substantially similar to the system 800 of FIGS. 8A and 8B, except the charging component 940 is fixed relative to the device 902 and the cap or sleeve 950 moves relative to the housing to expose the charging component 940. Specifically, when the sleeve 950 is retracted, the charging component 940 is exposed such that it can mate with an external power source for charging (FIG. 9B). The sleeve 950 can be held in its retracted position by a detent or other type of stop mechanism. After charging is completed, the sleeve 950 may be released to its extended position (FIG. 9A).

In various implementations, the sleeve 950 may be slidably coupled to the housing 908, where the housing 908 may include one or more stops 978 (e.g., one or more protuberances disposed on an outer wall of the housing 908) configured to define a length of travel for the sleeve 950 and/or to prevent the sleeve from accidentally becoming de-coupled from the housing 908. The sleeve 950 may also include one or more spring assemblies 976 configured to maintain the sleeve 950 in a desired position, for example, retracted for charging by use with one or more detents and release mechanisms. In some examples, magnetic force or a snap fit may be used to hold the sleeve 950 in the desired position. In some implementations, the sleeve 950 may be free to at least partially rotate about the housing 908 and include a geometric feature disposed on an inner wall thereof that can mate with a corresponding geometric feature disposed on an outer wall of the housing 908 to, for example, secure the sleeve 950 relative to the housing 908. In some implementations, the sleeve 950 is threadedly engaged with the housing 908 so that the sleeve 950 may be moved between its retraced and extended positions via a twisting motion. Additionally, the sleeve 950 may include a structure 984 (e.g., a recess in the sleeve's outer wall or a tab extending therefrom) that assists a user in moving the sleeve 950 between the retracted and extended positions.

FIGS. 10A and 10B depict an implementation of a system 1000 substantially similar to the system 900 of FIGS. 9A and 9B, except that instead of using a sliding or spring-loaded mechanism 950, the charging component 1040 is exposed from the aerosol provision device 1002 by a twisting mechanism 1062. In this implementation, the housing 1008 of the device 1002 has two outer shells 1008A and 1008B that are separated latitudinally and can rotate independent of each other. In one example, the 'distal' outer shell 1008B rotates clock-wise and the 'proximal' outer shell 1008A rotates in the opposite direction via a threaded engagement of the twisting mechanism 1062. This twisting motion causes a screw to extend or retract the charging component from inside the device 1002, such as, for example, a centrally disposed threaded rod that moves lineally via relative movement between the shells 1008A, 1008B.

Alternatively, the two outer shells 1008A, 1008B may be in direct threaded engagement with or without a stop for preventing accidental disengagement of the shells 1008A, 1008B. In some examples, the stop may be a detent or geometric feature that requires additional force to slide over to prevent disassembly of the shells 1008A, 1008B, but allows for a set range of motion sufficient for the charging component 1040 to advance through and retract within one of the shells 1008A, 1008B. In one example, the distal shell 1008B may be slightly larger than the proximal shell 1008A so that the distal (and outer) shell moves longitudinally up on the proximal (and inner) shell to expose the charging component 1040. The charging component 1040 may pass through an opening at distal end of one of the shells and may include a flap 872 as previously described.

In various implementations, the charging component 1040 may alternatively be exposed from either side of the aerosol provision device 1002, which would allow the device to maintain an upright position while charging. Alternatively, the mechanisms for deploying the charging component may be modified so that the charging component 1040 may extend from the device 1002 at an angle (e.g., 90°) from a longitudinal axis 1080 of the device. In some implementations, the charging component may be deployed at an angle of about 30° to about 90° to the longitudinal axis 1080. In implementations where the charging component is deployed at an angle, the opening and flap may be disposed in a side wall of one of the shells 1008A, 1008B as opposed to at an end thereof. In some examples, the charging component 1040 may be extended out of the side wall via a pivoting mechanism 1086 similar to a universal joint, a tracta joint, a birfield joint, a rzeppa joint or similar modified to have a frictional fit between the two halves of the joint.

The pivoting mechanism 1086 may include a hinge-like mechanism utilizing a concentric circle mechanical interface between the device body 1002 and base of the charging component 1040, arranged such that the pivoting motion of the charging component 1040 is resisted by the frictional force between the inner and outer concentric circle features of the hinge-like mechanism. The tolerance between the inner and outer concentric features is specified such that the user may rotate the charging feature from inside the device body to a desired position, and the frictional resistance will maintain the charging component at the position with a force equal to or greater than the torque applied by the device body.

The pivoting mechanism 1086 may also comprise geometric or magnetic detents in the concentric features that provide user perceivable feedback during the pivoting motion. The features are most preferably positioned where the charging component creates, for example, a 45-degree and/or 90-degree angle from the longitudinal axis of the device 1002, but may be positioned at any angle between 0 and 90 degrees from the longitudinal axis of the device.

In some example implementations, the charging component 1041) may also include a rotational mechanism that locks the pivoting mechanism 1086 into a desired angle from the longitudinal axis of the device 1002. When the charging component 1040 is twisted or rotated, friction is created within the concentric feature with a force greater than or equal to the weight of the device 1002. An example of this implementation is a threaded screw feature that causes interference within the tolerance of the concentric pivoting mechanism 1086. The internal circle of the concentric pivoting mechanism 1086 may also contain through-holes such that the screw feature locks the pivoting mechanism 1086 into place when the user twists/rotates the charging component 1040. The charging component and screw feature are designed such that a quarter turn causes the pivoting mechanism 1086 to freeze, specifically allowing the charging component 1040 to be plugged into, for example, a female USB receiver that is oriented horizontally, so as to maintain the device 1002 in an erect or standing position.

FIGS. 11A and 11B depict an implementation of a system 1100 similar to systems 600, 700 described above, but with the consumable not shown. Instead of using a single removable or moveable cap or sheath, the charging component 1140 is enclosed via a sheath 1154 including two (2) pieces that are mirror images of each other, fixed to the housing 1108 of the device 1102 with hinge members 1152 such that they may rotate in a "butterfly" fashion to expose the charging component 1140. Alternatively, the sheath 1154 could me made up of more than two pieces or portions that are moveably coupled to the housing 1108 and move relative thereto between closed and open positions.

To charge the device 1102, the sheath 1154 is moved into the open position either manually (e.g., by rotating the portions downwardly) or via a deployment mechanism, such as a spring-loaded actuator, so as to expose the charging component 1140. Once charging is complete, the two portions rotate back into their original position and are held together by, for example, magnetic force, a snap fit, or spring-loaded hinges configured to firmly hold the sheath 1154 in the closed position. The void formed by the portions of the sheath is slightly larger in cross-sectional area than a cross-sectional area of a consumable cartridge. In some implementations, the sheath portions are configured to engage with the consumable/cartridge or merely partially enclose the consumable/cartridge in the closed position.

FIGS. 12A and 12B depict an implementation of a system 1200 substantially similar to any of the systems 200 through 1100 described above, except that instead of using a fixed charging component, the charging component 1240 in the implementation depicted in FIGS. 12A and 12B is disposed at the end of a charging cable 1268, the cable being fixedly attached to the charging circuitry 1212 inside the device 1202. In some implementations, the cable 1268 and the charging component 1240 are housed inside a cavity 1270 within a distal end of the housing 1208. When charging is required, the user removes a cap from the cavity, exposing the charging component 1240 and charging cable 1268.

One benefit of this implementation is that it allows more freedom if the user wants to nape-while-charging. The cable 1268 and the charging component 1240 may be folded or wrapped, and inserted back into the cavity when charging is completed. In some examples, a flat cable is used so that it may be efficiently packed inside the cavity 1270. Alternatively, the cord 1268 may be retracted inside the device 1202 by a spring-loaded spool that effectively wraps the cord for the user. When charging is required, the user pulls the cable 1268 and the charging component 1240 out of the cavity, putting a load on the spring that is used to retract the cord. When the cord is pulled out of the cavity, the spring is locked by a holding pin that will not allow the cord to be retracted until the user pushes a retraction button 1260. This button moves the holding pin from its interference position, allowing the load on the spring to retract the cord back into the cavity. When it is retracted, the charging component 1240 may be held in position using magnets. One or more magnets within the cavity 1270 align with magnets on the charging component 1240. The charging component 1240 may also be press-fit into position using one or more geometric features inside the cavity 1270.

FIG. 13 depicts an implementation of a system 1300 similar to any of the systems 200 through 1200 described above, and in particular systems 800, 900 insofar as the device 1302 includes a sliding sleeve 1350. As shown in FIG. 13, the sleeve 1350 extends approximately the entire length of the device 1302 and utilizes one or more springs 1378, magnets 1374, and magnetic detents 1376A, 1376B to form a push-to-eject deployment mechanism. As the user pushes the top portion of the device 1302, the external housing or sleeve 1350 slides up and the charging component 1340 slides through an opening 1382 in the distal end of the device, with or without a flap 872 such as those described hereinabove. When the charging component 1340 is fully ejected, the magnet 1374 aligns with the lower detent 1376B in the housing 1308 holding the charging component in an extended position for charging. Once charging in complete, the user slides the sleeve 1350 back over the charging component 1340 by pressing the charging component 1344) until the magnet 1374 is released from the lower detent 1376B and aligns with the upper detent 1376A, thereby locking the sleeve 1350 relative to the housing 1308. The magnetic ball and detent function may also be accomplished by a spring-loaded ball fixed on an inner wall of the sleeve 1350 and a matching groove on an outer wall of the housing 1308. Similar to the other systems, the system 1300 of FIG. 13 may include a feedback mechanism, which in some examples may be a function of or incorporated into the deployment mechanism.

Many modifications and other implementations of the disclosure will come to mind to one skilled in the art to which this disclosure pertains having the benefit of the teachings presented in the foregoing descriptions and the associated figures. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. An aerosol provision device comprising:
   a housing configured to interface with a consumable;
   a power source disposed within the housing and configured to provide power to an aerosol generator;
   a charging connection coupled to the housing and in electrical communication with the power source, the charging connection configured to interface directly with an external power source, wherein the charging connection is hingedly coupled to the housing and configured to move from a first position at least partially disposed within the housing and a second position extending from at least one of a distal end or a side wall of the housing; and
   an actuator coupled to the housing and configured to move the charging connection between a first position and a second position relative to the housing.

2. The aerosol provision device of claim 1, wherein charging connection is a male-end port selected from the group consisting of Universal Serial Bus (USB) type A, USB type B, USB type C, mini USB type A, micro USB type A, mini USB type B, micro USB type B, or other 5V connector.

3. The aerosol provision device of claim 1, wherein, in the second position, a longitudinal axis of the charging connection intersects with a longitudinal axis of the aerosol provision device at an angle of about 30 degrees to about 90 degrees.

4. The aerosol provision device of claim 1, wherein the housing further comprises a cap disposed on a distal end of the housing and the charging connection is located within the cap when the cap is coupled to a body of the housing.

5. The aerosol provision device of claim 4, wherein the cap is removable to expose the charging connection and configured to be secured to another portion of the housing.

6. The aerosol provision device of claim 5, wherein the cap is configured as a mouthpiece to be used with the aerosol provision device.

7. The aerosol provision device of claim 6, wherein the cap comprises a flow tube and a flavoring material.

8. The aerosol provision device of claim 4, wherein the cap is coupled to the housing via a hinge mechanism.

9. The aerosol provision device of claim 4, wherein the cap comprises at least two portions coupled to the housing via one or more hinge mechanisms and configured so as to rotate relative to the housing to expose the charging connection.

10. The aerosol provision device of claim 9, wherein the at least two portions are maintained in a closed configuration.

11. The aerosol provision device of claim 10, wherein the two portions are maintained in a closed configuration via at least one of via at least one of a spring mechanism, a snap-fit, or a magnetic force.

12. The aerosol provision device of claim 4 further comprising a feedback mechanism to indicate to a user that the cap is securely attached to the body of the housing.

13. The aerosol provision device of claim 12, wherein the feedback mechanism provides at least one of an audible indication, a tactile indication, a visual indication, or a combination thereof.

14. The aerosol provision device of claim 1, wherein the actuator comprises at least one of a spring-loaded push button or a sliding mechanism.

15. The aerosol provision device of claim 1, wherein the actuator comprises a detent to maintain the charging connection in at least one the first position or the second position.

16. The aerosol provision device of claim 1 further comprising the consumable, wherein the consumable comprises a cartridge comprising:
 a mouthpiece having a proximal end and a distal end, the proximal end of the mouthpiece having an exit portal defined therethrough;
 a tank defining a proximal end and a distal end and being configured to contain an aerosol precursor, wherein the distal end of the mouthpiece is configured to engage the proximal end of the tank; and
 the aerosol generator configured to generate an aerosol from the aerosol precursor.

17. The aerosol provision device of claim 16, wherein the cartridge further comprises an integrated circuit comprising a female-end electrical connection and the power source comprises a male-end electrical connection configured to removably engage the female-end electrical connection of the cartridge to provide power thereto, wherein the male-end electrical connection is configured to both discharge power from the power source to the aerosol generator and to interface directly with the external power source to charge the power source.

18. An aerosol provision device comprising:
 a first cartridge comprising:
  a mouthpiece having a proximal end and a distal end, the proximal end of the mouthpiece having an exit portal defined therethrough;
  a tank defining a proximal end and a distal end and being configured to contain an aerosol precursor, wherein the distal end of the mouthpiece is configured to engage the proximal end of the tank;
  an aerosol generator configured to generate an aerosol from the aerosol precursor; and
  an integrated circuit comprising a first half of an electrical connection;
 a housing configured to interface with and at least partially enclose the first cartridge; and
 a power source disposed within the housing and including a second half of the electrical connection configured to removably engage the first half of the electrical connection of the first cartridge to provide power thereto, wherein the second half of the electrical connection is configured to both discharge power from the power source to the aerosol generator and to interface directly with an external power source to charge the power source.

19. The aerosol provision device of claim 18, wherein the electrical connections are selected from the group consisting of USB type A, USB type B, USB type C, mini USB type A, micro USB type A, mini USB type B, micro USB type B, or other 5V connector.

20. The aerosol provision device of claim 18, wherein the aerosol generator and integrated circuit are integrally formed as a single component.

21. The aerosol provision device of claim 20, wherein the single component comprises a chip with a flat, resistive heater trace printed on one surface and non-resistive leads extending from the same surface to the edge of the chip and configured to form the first half of the electrical connection and interface with the second half of the electrical connection.

22. The aerosol provision device of claim 21, wherein the chip comprises at least one of a silica, a ceramic composition, a carbon based substrate, or a combination thereof.

23. The aerosol provision device of claim 18 further comprising a second cartridge, the second cartridge comprising:
 a mouthpiece having a proximal end and a distal end, the proximal end of the mouthpiece having an exit portal defined therethrough;
 a tank defining a proximal end and a distal end and being configured to contain an aerosol precursor, wherein the distal end of the mouthpiece is configured to engage the proximal end of the tank;
 an aerosol generator configured to generate an aerosol from the aerosol precursor; and
 an integrated circuit comprising a first half of an electrical connection,
 wherein the housing is configured to interface with and at least partially enclose the second cartridge at an end of the housing opposite the first cartridge and the power source includes a second half of the electrical connection configured to removably engage the first half of the electrical connection of the second cartridge to provide power thereto, wherein the second half of the electrical connection of the second cartridge is configured to both discharge power from the power source to the aerosol generator of the second cartridge and to interface directly with the external power source to charge the power source.

24. The aerosol provision device of claim 23, wherein the first cartridge and the second cartridge are interchangeable.

25. A cartridge for an aerosol provision device comprising:

a mouthpiece having a proximal end and a distal end, the proximal end of the mouthpiece having an exit portal defined therethrough;

a tank defining a proximal end and a distal end and being configured to contain an aerosol precursor, wherein the distal end of the mouthpiece is configured to engage the proximal end of the tank;

an aerosol generator configured to generate an aerosol from the aerosol precursor; and an integrated circuit comprising one half of an electrical connection, wherein the cartridge is configured to interface with the aerosol provision device via a mating half of the electrical connection.

26. The cartridge of claim 25, wherein the cartridge is configured to be removably coupled to the aerosol provision device.

27. An aerosol provision device comprising:

a housing configured to interface with a consumable;

a power source disposed within the housing and configured to provide power to an aerosol generator;

a charging connection coupled to the housing and in electrical communication with the power source, the charging connection configured to interface directly with an external power source; and a sleeve movably coupled with the housing and configured to move between a retracted position to expose the charging connection and an extended position to at least partially enclose the charging connection.

28. The aerosol provision device of claim 27, wherein the charging connection is coupled to the housing via a cable coupled to the power source.

29. The aerosol provision device of claim 28 further comprising a spring-loaded spool disposed within a cavity of the housing for securing the charging connection and cable in a retracted position.

30. The aerosol provision device of claim 27, wherein the sleeve is slidably coupled to the body of the housing and configured to slide between the retracted and extended positions.

31. The aerosol provision device of claim 30, wherein the housing further comprises a spring mechanism configured to maintain the sleeve in the extended position.

32. The aerosol provision device of claim 27, wherein the housing further comprises a rotary mechanism configured to move the sleeve between the retracted and extended positions via a twisting motion.

33. The aerosol provision device of claim 27 further comprising a feedback mechanism to indicate to a user that the sleeve is secured in its extended position.

34. The aerosol provision device of claim 33, wherein the feedback mechanism provides at least one of an audible indication, a tactile indication, a visual indication, or a combination thereof.

* * * * *